United States Patent [19]

Baur

[11] Patent Number: 5,388,946

[45] Date of Patent: Feb. 14, 1995

[54] SYSTEMS AND METHODS FOR THE AUTOMATED ARCHIVING AND RETRIEVAL OF COMPUTER DATA STORAGE CASSETTES

[75] Inventor: Rolf Baur, Heubach-Lautern, Germany

[73] Assignee: Grau GmbH & Co., Germany

[21] Appl. No.: 261,310

[22] Filed: Jun. 16, 1994

Related U.S. Application Data

[60] Continuation of Ser. No. 627,023, Dec. 13, 1990, abandoned, which is a division of Ser. No. 391,284, Aug. 9, 1989, Pat. No. 5,015,139, which is a continuation-in-part of Ser. No. 182,593, Apr. 18, 1988, abandoned, and a continuation-in-part of Ser. No. 182,702, Apr. 18, 1988, abandoned.

[30] Foreign Application Priority Data

Jan. 20, 1988 [DE] Germany ............................ 3801397

[51] Int. Cl.⁶ .............................................. B65G 1/04
[52] U.S. Cl. ................... 414/281; 414/744.3; 414/618; 414/273; 414/277; 414/730; 360/92; 364/478
[58] Field of Search ............... 414/331, 273, 277, 280, 414/620, 281, 282, 283, 751, 753, 618, 619, 744.3, 744.4, 744.5, 744.8, 735, 730, 740, 738, 739; 364/478; 369/36; 360/92, 69; 901/45, 31, 34, 37; 294/88, 103.1, 104

[56] References Cited

U.S. PATENT DOCUMENTS

| | | |
|---|---|---|
| 729,642 | 6/1903 | Nash . |
| 2,512,465 | 6/1950 | Moorhouse ............... 211/1.5 |
| 3,233,750 | 2/1966 | Bannon . |
| 3,262,593 | 7/1966 | Hainer . |
| 3,715,040 | 2/1973 | Polus et al. . |
| 3,802,580 | 4/1974 | Castaldi . |
| 3,822,025 | 7/1974 | Loos . |
| 3,831,197 | 8/1974 | Beach et al. ............. 360/71 |
| 3,848,753 | 11/1974 | Borg et al. . |
| 3,854,604 | 12/1974 | Peterson et al. .......... 360/92 |
| 3,881,053 | 4/1975 | Lemelson ............... 178/6.8 |
| 3,920,195 | 11/1975 | Sills et al. . |
| 3,938,190 | 2/1976 | Semmlow et al. ........ 360/72 |

(List continued on next page.)

FOREIGN PATENT DOCUMENTS

| | | |
|---|---|---|
| 0162248 | 11/1985 | European Pat. Off. . |
| 0276967 | 8/1988 | European Pat. Off. . |
| 0288165 | 10/1988 | European Pat. Off. . |
| 2115764 | 7/1972 | France . |
| 2610755 | 8/1988 | France . |
| 146268 | 9/1979 | German Dem. Rep. . |
| 158617 | 6/1981 | German Dem. Rep. . |
| 159617 | 3/1983 | German Dem. Rep. . |
| 1431675 | 3/1969 | Germany . |

(List continued on next page.)

OTHER PUBLICATIONS

Lokalnachrichten, "Echter Schritt in die Zukunft", p. 9, Friday, Feb. 6, 1987.

(List continued on next page.)

*Primary Examiner*—Frank E. Werner
*Attorney, Agent, or Firm*—Nixon & Vanderhye

[57] ABSTRACT

A system especially adapted to retrieve, insert and transport a computer data storage cassette between spaced-apart cassette library and cassette drive unit sites. The system includes a robot carried by a movable transport assembly which is operable to transport the robot between the cassette library and cassette drive unit sites. The robot itself includes an especially adapted robotic manipulator whereby the cassette may be gripped and released. A mechanical cassette ejector is preferably provided to ensure that the cassette is expelled from the fingers of the robotic manipulator when the cassette is released. A push rod may also be provided so as to engage, and thus manipulate, a door which covers a slot of the cassette drive unit. Controlled movements of the transport system will bring the robotic manipulator into an initial position relative to the cassette in the cassette library or the cassette drive unit, such that controlled movements of the robot will then effect precise positioning of the manipulator relative to the cassette.

56 Claims, 11 Drawing Sheets

U.S. PATENT DOCUMENTS

| | | | |
|---|---|---|---|
| 4,164,765 | 8/1979 | Gysling | 360/92 |
| 4,219,296 | 8/1980 | Fujii et al. | 414/273 |
| 4,271,440 | 6/1981 | Jenkins et al. | 360/92 |
| 4,327,834 | 5/1982 | Kalthoff et al. | 209/609 |
| 4,428,710 | 1/1984 | Grisebach et al. | 414/590 |
| 4,621,711 | 11/1986 | Miyashige et al. | 187/9 E |
| 4,626,160 | 12/1986 | Shiomi et al. | 414/222 |
| 4,644,425 | 2/1987 | Tamaki | 360/69 |
| 4,653,794 | 3/1987 | Atlas | |
| 4,655,674 | 4/1987 | Kohler et al. | 414/735 |
| 4,664,590 | 5/1987 | Maekawa | 414/744 |
| 4,674,181 | 6/1987 | Hamada et al. | 29/703 |
| 4,674,893 | 6/1987 | Teramachi | 384/45 |
| 4,675,856 | 6/1987 | Rudy et al. | 369/36 |
| 4,678,390 | 7/1987 | Bonneton | 414/282 |
| 4,683,987 | 8/1987 | Sakata et al. | |
| 4,692,038 | 9/1987 | Kasai | 384/45 |
| 4,742,405 | 5/1988 | Teranishi | 360/92 |
| 4,749,327 | 6/1988 | Roda | |
| 4,754,445 | 6/1988 | Young et al. | 369/37 |
| 4,768,428 | 9/1988 | Silvestrini et al. | |
| 4,802,035 | 1/1989 | Ohtsuka | 360/92 |
| 4,837,647 | 6/1989 | Nonaka et al. | 360/92 |
| 4,844,679 | 7/1989 | Teranishi | 414/331 |
| 4,850,658 | 7/1989 | Sandor | 312/225 |
| 4,860,133 | 8/1989 | Baranski | 414/281 X |
| 4,864,511 | 9/1989 | Moy et al. | 364/478 |
| 4,920,432 | 4/1990 | Eggers et al. | 360/33.1 |
| 4,928,245 | 5/1990 | Moy et al. | 364/513 |
| 4,945,429 | 7/1990 | Munro et al. | 360/92 |
| 4,984,106 | 1/1991 | Herger et al. | 414/280 X |
| 5,003,417 | 3/1991 | Grant | 414/280 X |
| 5,015,139 | 5/1991 | Baur | 414/749 |
| 5,020,958 | 6/1991 | Tuttobene | 414/281 |
| 5,064,337 | 11/1991 | Asakawa et al. | 414/639 |
| 5,088,604 | 2/1992 | Baur | 211/1.5 |
| 5,109,915 | 5/1992 | Osusko | 414/728 X |

FOREIGN PATENT DOCUMENTS

| | | | |
|---|---|---|---|
| 2047386 | 4/1971 | Germany | |
| 7120189.3 | 5/1971 | Germany | |
| 7120189 | 5/1971 | Germany | |
| 2503505 | 8/1976 | Germany | |
| 2754176 | 2/1977 | Germany | |
| 2519870 | 6/1979 | Germany | |
| 2900194 | 7/1980 | Germany | |
| 3006205 | 8/1980 | Germany | |
| 2911615 | 10/1980 | Germany | |
| 3147285 | 11/1981 | Germany | |
| 2564363 | 5/1984 | Germany | |
| 3612531A1 | 11/1986 | Germany | |
| 8631725.3 | 11/1986 | Germany | |
| 3621790 | 1/1988 | Germany | |
| 3621790A1 | 1/1988 | Germany | |
| 122263 | 9/1980 | Japan | 360/92 |
| 156107 | 12/1980 | Japan | 414/280 |
| 56-124159 | 9/1981 | Japan | |
| 56-124160 | 9/1981 | Japan | |
| 60-61947 | 4/1985 | Japan | |
| 60-118506 | 6/1985 | Japan | |
| 61-11963 | 7/1986 | Japan | |
| 61-158063 | 7/1986 | Japan | |
| 61-170953 | 8/1986 | Japan | |
| 233458 | 10/1986 | Japan | 360/92 |
| 62-16457 | 4/1987 | Japan | |
| 2053148 | 2/1981 | United Kingdom | 414/744.5 |
| 1587056 | 3/1981 | United Kingdom | |
| 0581085 | 12/1977 | U.S.S.R. | |
| 117-840-A | 10/1983 | U.S.S.R. | |
| 1172840 | 8/1985 | U.S.S.R. | |
| 1215936 | 3/1986 | U.S.S.R. | 901/45 |
| 8606050 | 10/1986 | WIPO | 414/273 |
| 8707751 | 12/1987 | WIPO | 360/92 |

OTHER PUBLICATIONS

Gmünder Tagespost, "Atuomatisches Bandkassetten–Bedienungs–Archiv", Friday, Feb. 6, 1987.

Heidenheim, "Ein Schritt in die Zukunft", Feb. 9, 1987.

Letter from IBM Deutschland GmbH to Grau, Feb. 13, 1987.

Automatisches Bandkassetten Bedienungs Archiv (ABBA) für Magnetbandsystem IBM 3480–Gesamtansicht (Feb. 5, 1987).

Das Automatische Bandkassetten–Bedienungsarchiv–ABBA (Feb. 5, 1987).

Speichersysteme, "Automtisches Bandarchiv mit Magnetbandkassetten" IBM 3480 (Feb. 1987).

Axel Müller, "Installation eines automatischen Bandarchivs im IBM–Rechenzentrum Böblingen", G.U.I.D.E. Mar. 25–27, 1987.

Teilnehmerverzeichnis, G.U.I.D.E. Mar. 25–27, 1987.

Lenz, "Weiterentwicklung von ABBA bis zur Serienreife", Feb. 27, 1987.

Kaufmann, "Zwischenbericht der ABBA-Erstinstallation im RZ-Böblingen der Firma IBM vom 4.7.87 (Jul. 4, 1987)".

(List continued on next page.)

OTHER PUBLICATIONS

Letter from Grau GmbH & Co. to IBM, Aug. 13, 1987.
Bauer, "Aktennotiz: Abwicklung IBM", Aug. 22, 1987.
Kaupert, "Montagebericht: bei IBM in Böblingen am 23.3.88", Aug. 24, 1988.
Kaupert, "IBM Böblingen: Verzögerung der IBM Inbetriebnahme", Aug. 29, 1988.
Pp. 11 and 56–57, 1.2 Motion of Robot; 1.3 Description Table; FIG. 3.2.2(c) (Source and publication date unknown).
(Mar. 16, 1988) Grau Lampertz brochure CeBIT'88, Hanover.
(Dec. 16, 1987) Grau GmbH & Co. layout drawing.
(Nov. 27, 1987) Grau GmbH & Co. layout drawing.
(Mar. 1983) "Tape Cartridge Library System", IBM Technical Disclosure Bulletin, vol. 25, No. 10, pp. 5006–5007.
(Nov. 19, 1982) "A New Level of Automation in Work-in-Process Handling", reprinted from Modern Materials Handling, pp. 48–51.
(1978) "Greifer fur Industrieroboter", in the periodical Forden und Heben, 28, No. 1, pp. 40–43.
(Oct. 1973) "Cartridge Handling Systems", IBM Technical Disclosure Bulletin, vol. 16, No. 5, pp. 1584–1585.
Patent Abstract of Japan, vol. 10, No. 387 JP-A-6-1-175967.
Patent Abstract of JP 52-133726.
(1967) "Design of Real-Time Computer Systems" by James Martin, Prentice-Hall, Inc., pp. 44–45.
"Marketing", IBM Corporation, Meues RZ-Geschaft mit IBM Industriorobotern, No. 7 (Mar. 1, 1989).
Patent Abstract of JP-133726.
SMPTE Journal, Apr. 1979, vol. 88, No. 4, pp. 221–223.
Articles re "A New Level of Automation in Work-in-Process Handling". Bosch Catalogue entitled Flexible Automation and Handling Technology, dated Aug. 1986.
Bittler Catalogue entitled "Bittler Modul Systeme", dated Oct. 1985.
Sensor Review, Jan. 1983, pp. 39–43.
"VDI-Zeitschrift", 125 (1983), No. 5, pp. 143–149.
Patent Abstracts of Japan, P-465, Jun. 7, 1986, vol. 10, No. 160.
"Magnetbandsystem IBM 3490: Kassetten-bandlaufwerke in Kompaktbauweise", IBM Form GT12-4273-2 (Nov. 1990).
"Fertigungssystem IBM 7575/Fertigungssystem IBM 7576", IBM Form GT12-3383-1, Feb. 1987.

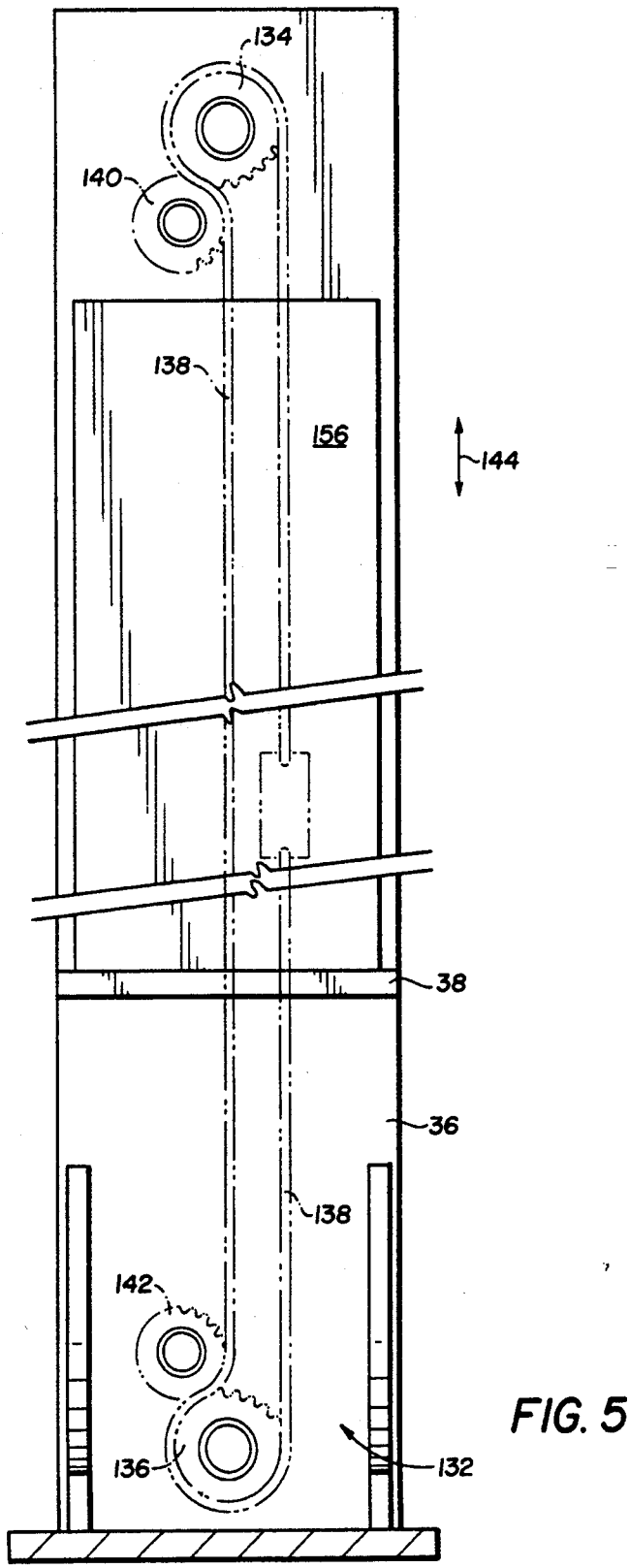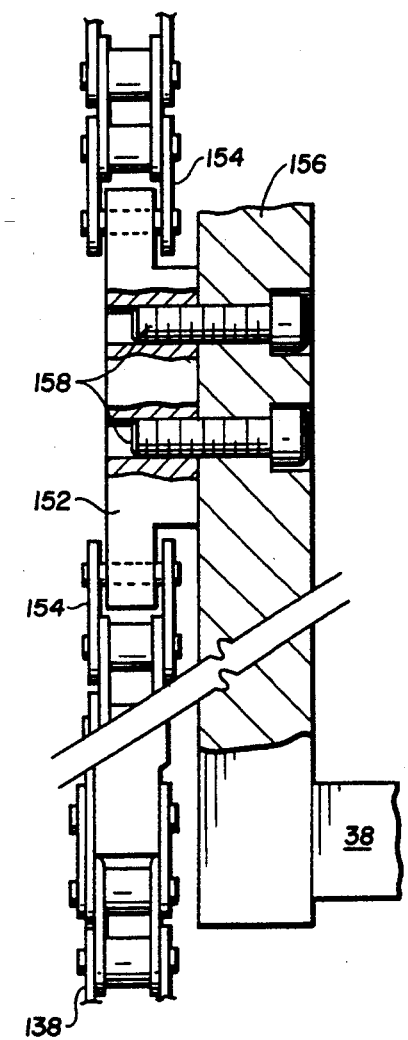
FIG. 5
FIG. 6

SYSTEMS AND METHODS FOR THE AUTOMATED ARCHIVING AND RETRIEVAL OF COMPUTER DATA STORAGE CASSETTES

CROSS-REFERENCE TO PARENT APPLICATIONS

This is a continuation of Ser. No. 07/627,023, filed Dec. 13, 1990, now abandoned, which in turn is a divisional of Ser. No. 07/391,284, filed Aug. 9, 1989 (now U.S. Pat. No. 5,015,139 issued May 14, 1991), which in turn is a continuation-in-part of Ser. Nos. 07/182,593 and 07/182,702, both filed Apr. 18, 1988, and both now abandoned, the entire content and disclosure of each said U.S. Application being expressly incorporated hereinto by reference.

FIELD OF THE INVENTION

This invention relates to the robotics field. More specifically, the invention relates to especially adapted robotics systems and methods for the automated archiving and retrieval of computer data storage cassettes. The invention also includes an especially adapted manipulator which, in the preferred embodiment, is capable of interacting with the computer data storage cassette. In this regard, the invention is particularly well suited for use in automated mass data storage facilities such that data storage media (e.g., magnetic tape cassettes) may automatically be retrieved from a storage library site, conveyed to a media reading site (e.g., a cassette drive unit) and then inserted/removed from the media reading site. Means are provided according to the invention to assist interaction between the robot hand, the article and such library and media reading sites (e.g., via an article ejection member, an indexing mechanism, shock absorbing structures to prevent structural "crash" between the robot manipulator and the equipment with which it interacts, and the like).

BACKGROUND AND SUMMARY OF THE INVENTION

Today's large scale computer rooms typically employ human technicians which manually load magnetic data storage media (e.g. magnetic tape spools) onto computer drives. With the recent advent of computer tape cassettes (i.e., as represented by the IBM 7575 system), the space requirement for physically cataloging and storing the magnetic media has decreased (due to the decreased size of these tape cassettes as compared to the more conventional magnetic tape spools).

However, human intervention is still typically required when a tape cassette must be removed from, or inserted into, a computer's tape drive. Thus, it would be highly advantageous if an automated system was provided which was capable of retrieving a cassette from a library/storage location, transporting the cassette to a drive unit associated with the computer system, and then inserting the cassette into the drive unit. Such an automated system could also suitably be employed in a variety of other end use applications (i.e., other than in the context of a computer mass data storage facility), such as in radio and/or television broadcast stations whereby preprogrammed tape cassettes could automatically be retrieved from a library location and inserted into suitable playback equipment. Those in the art will undoubtedly appreciate other uses for the invention after considering the following description thereof. It is therefore towards attaining such an automated system that the present invention is directed.

The present invention achieves the advantages mentioned above by providing a complete system which is capable of moving an article (e.g., a data storage cassette) between a cassette library site and a cassette drive unit. To achieve this function, the robot system of the present invention includes a track which establishes a path of conveyance for the system between the cassette library and drive unit. A carriage assembly is coupled to the track and is capable of movements therealong by virtue of the meshed interengagement between a driven pinion gear (associated with the carriage assembly) and a gear rack (associated with one of the track members).

A robot is supported upon a platform which is coupled to a vertical column of the carriage assembly for slidable reciprocal movements between extreme lowered and raised positions (and any position intermediate these extremes). The platform (and hence the robot supported thereupon) is driven between these lowered and raised position by means of an endless flexible drive member (e.g., an endless chain) which is drivenly connected to a suitable reversible electric motor via a drive sprocket. Therefore, upon operation of the electric motor in one or another of its rotational directions, the platform (and hence the robot supported thereupon) is capable of being selectively displaced vertically between its raised and lowered positions, respectively. The transport system of this invention may thus assist in positioning the robot adjacent one of the separate equipment components with which it interacts (e.g., adjacent the cassette library or cassette drive unit), and moreover, may move the robot between that component and another one of the components so that it may then interact with the latter component.

The robot is provided with a manipulator hand which is especially adapted to grip and release a data storage cassette. The manipulator hand is, moreover, especially adapted to interact not only with the cassette, but also with the cassette drive unit, and more particularly, with an input slot of the drive unit.

More specifically, the manipulator hand includes a pair of finger members which collectively establish a space therebetween for accepting the cassette and which are relatively moveable between a gripped position (wherein the cassette is gripped between the finger members) and a released position (wherein the cassette is released from its gripped relationship with the finger members).

A mechanical ejector is also preferably provided so as to insure that the cassette is positively removed from the manipulator hand when the fingers thereof are relatively moved into their released position. This mechanical ejector is preferably embodied in a generally U-shaped ejector member having a forward end which engages the cassette when the robot manipulator is advanced to grip the cassette. Upon this advancement, the ejector member is retracted (due to its mounting structures to be discussed below) against the urging force of a pair of compression springs.

The finger members thus are relatively moved so as to grip the article when the robot manipulator has been advanced sufficiently. At the same time, the ejector member is "loaded" due to the compression of its springs. Therefore, when the finger members release the cassette, this "loaded" force will drive the ejector member forwardly to responsively eject the cassette from the robot manipulator. In this manner, the ejector member ensures that the cassette will not "hang" onto the finger members.

The robot manipulator also preferably includes a push rod which extends rearwardly in a direction opposite to the finger members. This push rod is especially adapted to physically push the tape cassette into its final operative position within the tape drive. Also, the push rod serves to engage a movable door associated with a slot on the tape drive. When the push rod engages the opened door (i.e., after the robot manipulator has initially inserted a cassette into the drive unit's slot and after the push rod has seated the cassette into the drive unit), the entire robot manipulator is then moved in a downwardly direction, so that the manipulator thus serves the additional beneficial function of closing the drive unit's door to thereby place it in operation.

Means are also provided to ensure that mechanical shocks to the manipulator are absorbed. In this regard, the entire housing of the manipulator is mounted upon guide rails which allow it to be displaced rearwardly when the finger members experience a shock (as by imprecise alignment between the finger members and the equipment with which they interact). A shock spring urges the robot hand into its forward-most position, yet resiliently cushions its rearward movement relative to the guide rails when a shock is experienced, thereby damping the same. A spring-based shock absorbing assembly is also in operative association with the push rod to accomplish similar shock-absorbing functions.

In many end use environments, it will be necessary to pivot the finger members between first and second planar orientations—particularly, for example, if the cassettes are physically stored at a library location in a vertical orientation, but are inserted into/removed from the drive unit in a substantially horizontal orientation. To compensate for this need, the present invention includes structure which permits the finger members to be pivoted between these first and second planar orientations. In this regard, the housing for the robot manipulator is mounted (a) for vertical movements between raised and lowered positions, (b) rotational movements between first and second positions, and (c) lateral movements between initial and final positions. A platform is also provided which establishes a bearing surface and is disposed in a fixed-position with respect to these housing movements.

A cylindrical engagement surface and a locking assembly are each provided in operative association with the housing. When the housing moves into its lowered position, a terminal end of the locking assembly contacts the bearing surface to thereby unlock the housing to allow it to freely rotate between its first and second positions. At the same time (i.e., with the housing in its lowered position), frictional engagement occurs between the cylindrical engagement surface and the bearing surface. This frictional engagement thereby provides the means for rotating the housing between its first and second positions when the housing is laterally moved from its initial position to its final position.

Further aspects and advantages of this invention will become more apparent to the reader after careful consideration is given to the detailed description of the preferred exemplary embodiment thereof which follows.

BRIEF DESCRIPTION OF THE DRWINGS

Reference will be made hereinafter to the accompanying drawings wherein like reference numerals throughout the various FIGURES denote like structural elements, and wherein;

FIG. 5 is a front elevational view of the platform hoist column of the robot transport system;

FIG. 6 is a detailed cross-sectional elevation view of the connection between the platform and the hoist chain;

DETAILED DESCRIPTION OF THE PREFERRED EXEMPLARY EMBODIMENT

Figure 1:
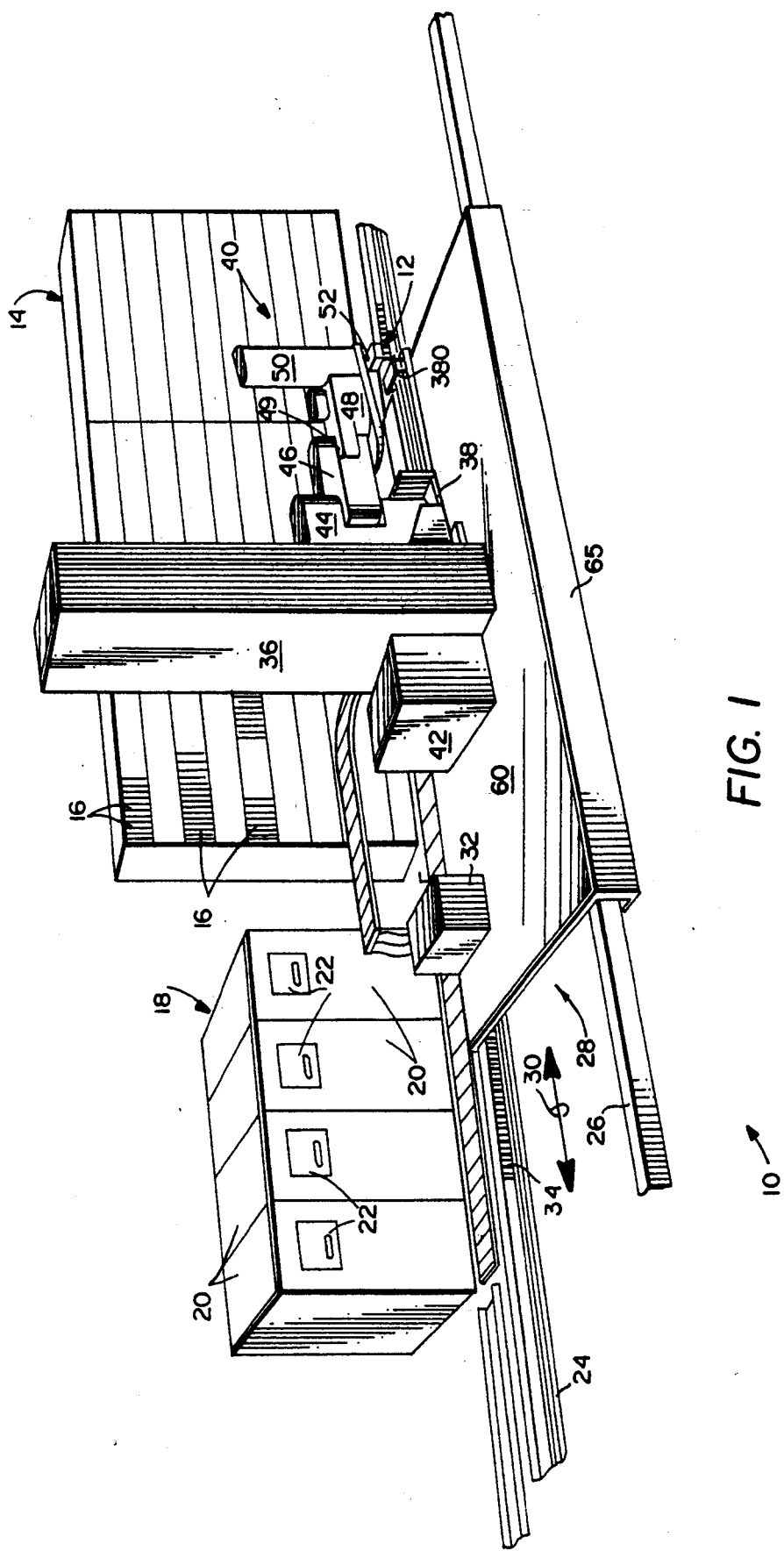
FIG. 1 is a schematic perspective view of a preferred robot transport system of this invention operating between a cassette storage site and a computer tape drive site.

A robot transport system 10 according to this invention which includes a robot manipulator 12 is shown schematically in FIG. 1 as operating between a cassette library site 14 (in which a number of magnetic tape cassettes 16 are catalogued) and a cassette drive site 18 having a number of individual drive units 20. The cassettes 16 are accepted within individual ones of the drive units 20 via a slot covered by a movable door 22 (the doors 22 for each tape drive 20 being shown in FIG. 1 in a closed state).

Movement of the trasport system 10 between the cassette library and drive sites 14, 18, respectively, is provided by means of parallel track members 24, 26 which are arranged adjacent both the library site 14 and the drive site 18. The tracks 24, 26 thus support a carriage assembly 28 for reciprocal rectilinear movements between the cassette library and drive sites 14, 18, respectively (e.g., in the directions shown by the arrow 30 in FIG. 1) provided by the interengagement between a pinion gear (not shown in FIG. 1, but to be discussed later) driven by a suitable reversible electric motor 32 and a gear rack 34 associated with the track member 24.

The carriage assembly 28 itself supports a vertical column 36 which includes a forward robot support platform 38 on which a robot assembly 40 is operatively mounted. The platform 38 is slidably mounted to the column 36 (in a manner to be discussed later) so as to be capable of vertical displacements between its extreme lowermost position (i.e., as shown in solid line in FIG. 1) and its extreme uppermost position (i.e., a position near the upper end of the column 30), in addtion to positions intermediate these extremes. A reversible electric motor 42 operatively drives a hoist chain (not shown in FIG. 1) connected to the platform 38 to thereby raise/lower the same.

The robot assembly 40 includes a drive column 44 (which houses drive gears, precision motors, etcetera) and has a proximal arm member 46 radially extending therefrom. The proximal arm is, moreover, connected to the drive column 44 to permit articulated relative movements about a vertical axis. A distal arm member 48 is also connected to the proximal arm member 46 at the joint 49 to permit relative articulation of arms 46 and 48 about a vertical axis established at the joint 49. Another drive column 50 (which houses another set of drive gears, precision motors, etcetera, not shown) for positioning the robot manipulator 12 is provided at the terminal end of distal arm member 48. Operative interengagement between the robot manipulator 12 and the drive column 50 is achieved by means of a rotatable and vertically displaceable (i.e. via the drive column 50) support shaft 52.

As will be appreciated, precise positioning of the robot manipulator 12 vis-a-vis an article to be grasped (e.g., a cassette 16) may be achieved by selective movements of the proximal arm member 46 (i.e., pivotal movements about the vertical axis established with the drive column 44), distal arm member 48 (i.e., pivotal movements about the vertical axis established at the articulated joint 49), and/or the robot manipulator (i.e., pivotal movements about a vertical axis established by the support shaft 52 and/or vertical displacements of shaft 52), in addition to the vertical displacements of the entire robot assembly 40 due to the movements of the platform 38 on which the robot assembly 40 is carried. All such movements may be programmed in a suitable microprocessor-based control system (not shown) so as to achieve precise predetermined movements of the robot manipulator 12 relative to an article and relative to other equipment (e.g., the drive units 20) thereby allowing the transport system 10 to achieve desired functions.

Figure 2:
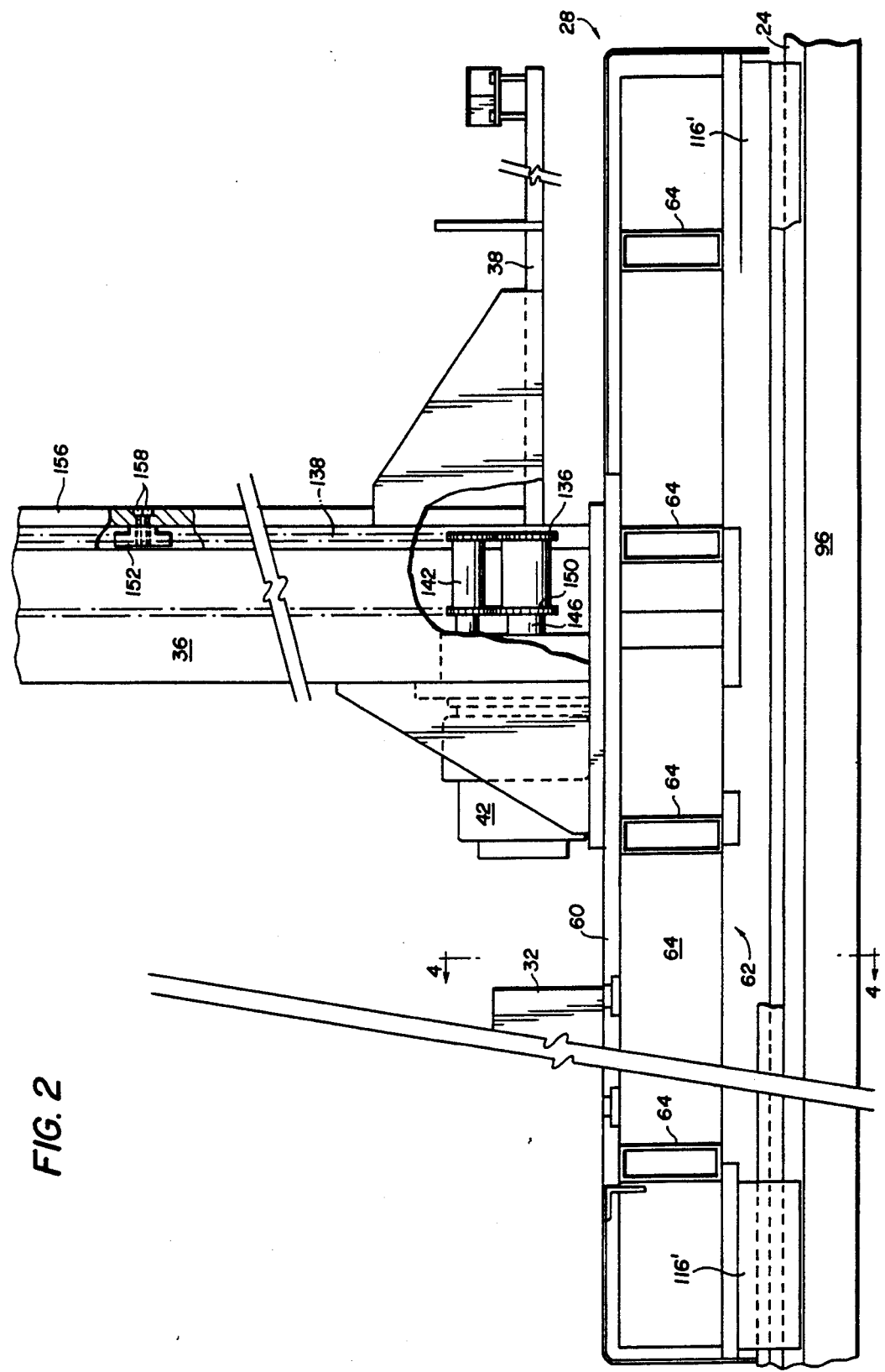
FIG. 2 is a side elevational view of the carriage assembly of this invention.
Figure 3:
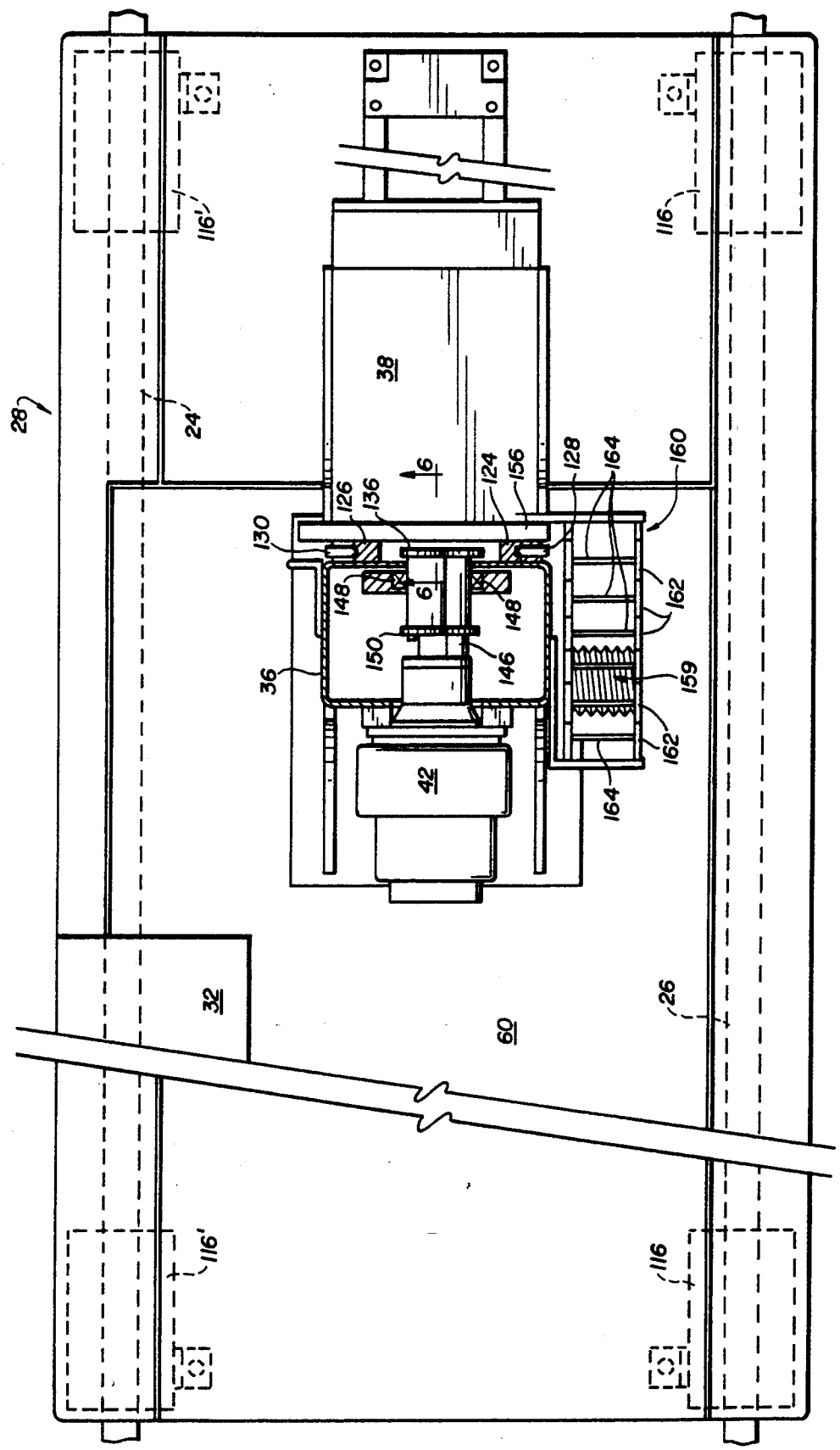
FIG. 3 is a top plan view of the carriage assembly shown in FIG. 2.
Figure 4:
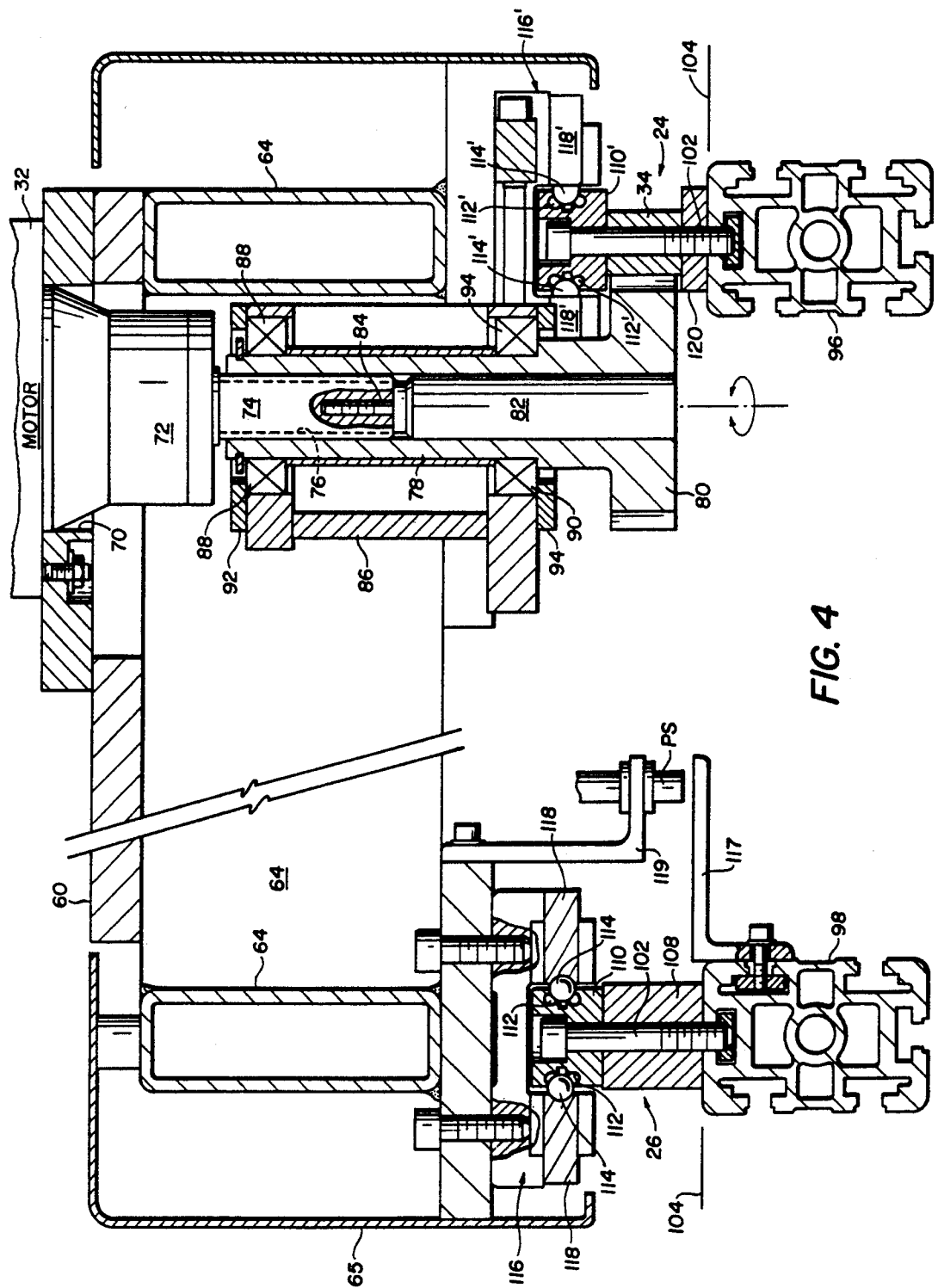
FIG. 4 is a cross-sectional elevational view of the carriage assembly shown in FIG. 2 as taken along line 4—4 therein.

FIGS. 2-4 show in greater detail the carriage assembly 28 of this invention and its operative interengagement to the track members 24, 26. As is seen, the carriage assembly 28 includes a planar support plate 60 rigidly connected to an undercarriage from 62 comprised of multiple rigid beams 64. Preferably, lateral skirts 65 are attached to, and thus hide, the undercarriage frame 62. A control center (not shown) may be positioned rearwardly of the column 36 so as house a variety of electronic control means (i.e., logic boards, signal converters, etectera) to receive the position signals generated by the sensors associated with the transport assembly 10 and/or the robot 40 and thus provide an interface with a console and/or a central processor (not shown).

Driven movements of the carriage assembly 28 along the tracks 24, 26 is provided by reversible electric motor 32 as can be seen more clearly in FIG. 4. As is seen, the motor 32 is rigidly mounted upon a motor support plate 66 via suitable bolts 68 (only one such bolt 68 being visible in FIG. 4) which defines a central recess 70 through which the drive shaft 72 of motor 32 extends. A spline shaft 74 is rigidly coupled at its upper end to the drive shaft 72 and is coaxially mated with the spline cavity 76 defined by the pinion gear shaft 78 (integrally associated with the pinion gear 80). A shaft extendsion 82, rigidly coaxially provided with the pinion shaft 78, is, in turn, rigidly coupled to the spline shaft 74 via a threaded bolt extension 84.

A shaft support frame 86 is rigidly coupled to the carriage assembly's undercarriage frame 64 and carries a axially spaced-apart pair of bearings 88, 90 so as to journally mount the pinion gear 80 for rotation about the vertical axis established by the pinion gear shafts 78. Upper and lower retainer plates 92 and 94 respectively retain the bearings 88 and 90 in operative associate with the pinion gear shaft 78.

The track members 24, 26 are each rigidly coupled to support beams 96, 98 via bolts 100, 102, respectively. As is seen in FIG. 4, the support beams 96, 98 are preferably disposed below the level of the computer room floor 104 (or the floor of any other facility in which the present invention may be employed) in the space between it and a subfloor 106. The space between the floor 104 and the subfloor 106 thus permits control cabling and the like to be run unexposed to/from the transport system 10.

Track member 26 is comprised of a lower support block 108 and an upper track block 110. Track block 110 establishes a pair of lateral recessed track guides 112 which receive ball bearings 114. The carriage assembly 28 is thus slidably coupled to the track member 26 through these bearings 114 via inverted U-shaped track couplers 116 disposed at each corner of the carriage assembly 28 in superjacent relationship to the track member 26 (see also FIG. 3). Rigid coupling of the track couplers 116 to the undercarriage frame 64 is provided by means of bolts 117. The track couplers 116 therefore include a pair of dependent bearing flanges 118 which are disposed laterally adjacent a respective one of the track rails 112 of the upper track block 110 with the bearings 114 disposed therebetween.

The track member 24 also preferably includes a number of angle brackets 117 fixed to the support beam 98 via bolts 117a at predetermined longitudinally spaced-apart locations therealong (it being understood that only a representative one of the angle brackets 117 is apparent in FIG. 4). A proximity sensor PS of a well known variety is carried by the undercarriage frame 64 of the carriage assembly 28 so as to move in superjacent relationship with respect to the brackets 117. Therefore, as the carriage assembly moves along the tracks 24 and 26, the proximity sensor PS is capable of sensing the presence of the brackets 117 so that the carriage assembly's position along the tracks 24 and 26 may be ascertained by suitable control algorithms associated with the controller (not shown). Thus, by "counting" the number of brackets the proximity sensor has passed during the carriage assembly's travel along the track members 24 and 26, and comparing this number to a "zeroed" state, the precise position of the carriage assembly may be determined. Obviously, other position sensing techniques well known to those in this art may also be employed.

The track member 24 also includes an upper track block 110' configured in a manner similar to that discussed above with reference to the upper track block 110 of track member 26. Therefore, those structures associated with track member 24 which are substantially similar to those structures already discussed above with reference to track member 24 have been identified by a prime (') notation following the reference numerals in the accompanying drawing FIGURES. Thus, a duplicate discussion of these similar structures is not believed to be necessary.

The track member 24, however, differs from track member 26 in the provision of ther gear rack 34 interposed between a spacer plate 120 and the upper track block 110'. The upper track block 110', gear rack 34, and the spacer plate 120 are rigidly coupled in that order to the support beam 96 via bolts 102'. As is seen in FIG. 4, the pinion gear 80 is intermeshed with the teeth of the gear rack 34 so that upon driven rotation of the pinion gear 80 in one or the other of its rotational directions (e.g., in one of the opposite directions indicated by the arrow 122 in FIG. 4), the entire carriage assembly 28 will be propelled forwardly or rearwardly (e.g., in one of the directions indicated by the arrow 30 in FIG. 1) along the track members 24 and 26. In such a manner, the carriage assembly 28 may be moved between the cassette library and drives sites 14 and 18, respectively (or between other spaced-apart equipment components adjacent to the path established by the track member 24 and 26).

Referring specifically to FIG. 3, it is seen that the robot platform is operatively coupled to guide rails 124, 126 forwardly of the column 36 by means of bearing connectors 128, 130, respectively. In this manner the platform is capable of reciprocal rectilinear vertical movements between extreme lowered and raised positions, as was briefly discussed above. This lowering-/raising of the platform 38 is accomplished a hoist assembly 132 which is more clearly shown in FIGS. 5 and 6.

As is apparent, the hoist assembly is generally comprised of upper and lower sprocket wheels 134, 136, respectively, around which an endless flexible drive chain 138 is operatively engaged. Adjustable tension sprockets 140, 142 are also provided in operative engagement with the drive chain 138 near the sprocket wheels 134 and 136, respectively, so that the correct tension is maintained upon the drive chain 138 during vertical movements of the robot platform 38.

The sprocket wheel 136 is driven for rotational movements in either clockwise or counterclockwise directions as viewed in FIG. 5 (i.e., so as to responsively effect vertical displacements of the platform 38 in the driection of arrow 144 towards the platform's lowered or raised positions, respectively) by means of the electrtic reversible motor 42. That is, the sprocket wheel 136 is fixed to the output shaft 146 (see FIG. 3) so that the former rotates in the same predetermined direction as the latter. It should be understood that the upper sprocket wheel 134 is not driven (although it could be, if desired), but rather is merely freely journalled to the column 36. The sprocket wheel 136 is, moreover, mounted for rotation via gearing blocks 148 as is seen in FIG. 3. As is also noted in FIG. 3, another sprocket wheel 150 is coaxially provided on shaft 146 of motor 42 so as to drive another endless chain member about an upper idler sprocket (not shown) so as to assist in the balancing of the hoist assembly 136 and thus minimize the load upon motor 42.

The robot platform 38 is itself fixed to drive chain 138 by means of a spacer block 152 mounted between opposed end-links 154 of the chain 138, as is shown more clearly in FIG. 6. The rear plate 156 of the platform 38 is thus rigidly coupled to this spacer block 152 by means of suitable bolts 158 to, in turn, couple the platform 38 for vertical movements along column 36 as previously discussed.

Since electrical cabling (identified in FIG. 3 by numeral 159) is required to establish electrical communication between the robot 40 and the control system (not shown), the cabling must be permitted to "follow" the platform during its vertical displacements along the column 36. To permit this (and to prevent the cabling from interfering with such platform displacements), an articulated cable support 160 is provided (see FIG. 3). The cable support is comprised of a series of support links 162 which are joined to one another for relative articulated movements via pivot pins 164. The pivot pins 164 also serve to permit the cabling to be physically attached thereto so that it may move together with the cable support 160. Of course the cable support 160 must be of sufficient length to permit it to follow the robot platform 38 to the latter's extreme raised position.

Figure 7:
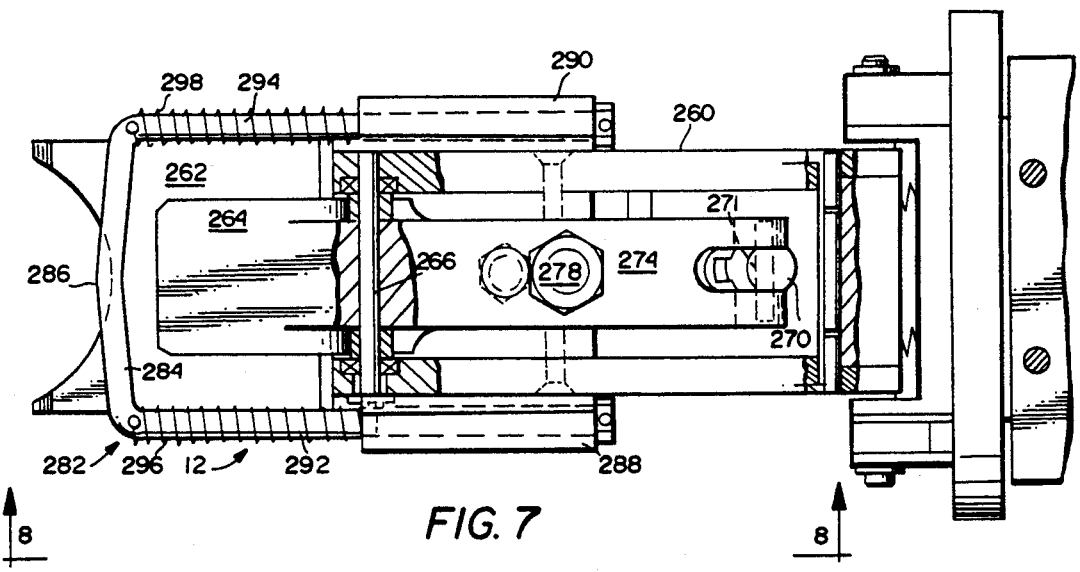
FIG. 7 is a top plan view, partially sectioned, of the manipulator hand of this invention.
Figure 8:
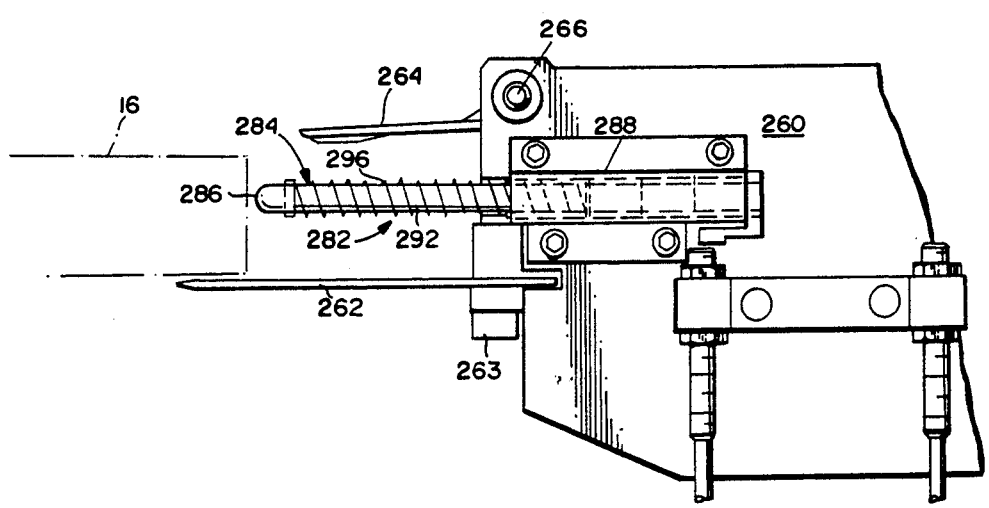
FIG. 8 is a partial side elevational view of the forward gripping end of the manipulator hand shown in FIG. 7 and taken along line 8—8 therein.
Figure 9:
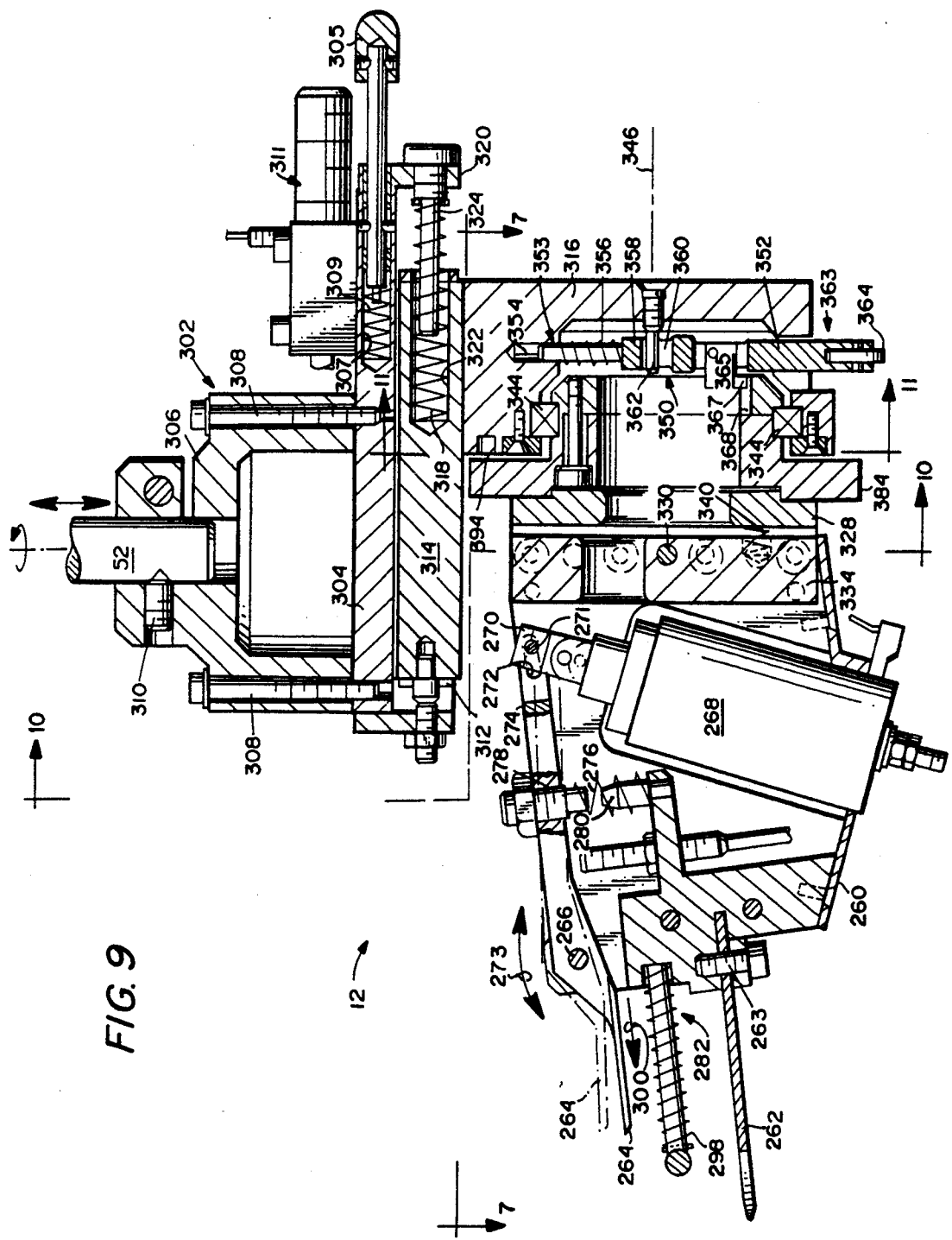
FIG. 9 is a cross-sectional side elevational view of the manipulator hand of this invention.

The robot manipulator 12 according to the present invention is more clearly shown in accompanying FIGS. 7–9. As is seen particularly in FIGS. 7 and 8, the robot manipulator 12 generally is comprised of a housing structure 260 having a pair of forwardly disposed finger members 2626 and 264, respectively. The lower finger member 262 is rigidly coupled to the housing 260 via suitable bolts 263 whereas the upper finger member 264 is pivotally connected to the housing 260 via a cross-axle 266. The separation distance between the upper and lower fingers 264 and 262, respectively, is sized and configured to accept an article, for example, a cassette 16, with which it interacts.

An actuator 268 is also contained within the housing structure 260 as is shown more clearly in FIG. 9. The actuator 268 includes an actuator rod 270 which is connected via a pin 271 to an elongate slot 272 defined in a proximal end 274 of the upper finger member 264. The actuator 268 is preferably an electro-magnetic type such that, upon energization, the actuator rod 270 will be drawn inwardly so as to responsively cause the upper finger member 264 to pivot (i.e., clockwise as indicated by arrow 273 in FIG. 9) about its axle 266 to the position noted in chain line in FIG. 9. This pivotal movement thereby increases the dimension between the upper and lower finger members 264 and 262, respectively, so that they are relatively moved into a "released" position. Upon deenergization, the actuator rod 270 returns to its "normal" state (i.e., as shown in solid line in FIG. 9 under the bias force assistance of compression spring 276 operating between a retainer 278 (associated with proximal end 274 of finger 264) and a retainer 280 (rigidly associated with housing 260). While in its "normal" position, it will be noted that an article (such as a cassette 16 will be gripped by the finger members 262 and 266, and thus be capable of manipulation by the robot manipulator 12. Other forms of actuators, such as electrical, pneumatic, or hydraulic types, or hybrids of such types, may also be suitably employed according to this invention.

An article ejector assembly 282 is also provided according to this invention and operates within the space defined between the upper and lower finger members 264 and 262, respectively. In the preferred embodiment, the ejector assembly 282 includes a general U-shaped ejector member 284 whose forward end 286 contacts the tape cassette 16 when the robot manipulator 12 is advanced relative to the cassette. Support structures 288, 290 on either side of the housing 260 support and mount the lateral arms 292, 294, respectively, of ejector member 284 for sliding rectilinear movement between extended and retracted positions. Compression springs 296, 298, respectively associated with each arm 292, 294 of the U-shaped ejector member 284 bias the ejector member 284 in a direction towards its extended position (i.e., in the direction of arrow 300 in FIG. 9).

The spring force of the coil springs 292 and 294 is increased ("loaded") when the robot manipulator 12 advances relative to the cassette 16—that is, when the ejector member 284 is moved from its extended position towards its retracted position. Therefore, when the griping relationship of the cassette 16 between the two opposed fingers 262, 264 is released (as by activating the actuator 268 to pivot the upper finger 264 clockwise as viewed in FIG. 9 in the manner described above), this loaded spring force will recoil to urge the ejector member 284 from its retracted position towards its extended position thereby ejecting the article (in this case the cassette 16) forwardly of the robot manipulator 12. Thus, the article does not "hang" onto the finger members 262, 264 due to the operative presence of this ejector assembly 282.

The robot manipulator 12 is itself mounted to the support shaft 52 via a shock-absorbing subassembly 302 which is shown more clearly in FIG. 9. This subassembly 302 generally includes an upper support plate 304 rigidly connected to a hub 306 via bolts 308. Hub 306 is, in turn, rigidly connected to the support shaft 52 via a set screw 310. The upper support plate 304 establishes a pair of guide rails 312 (only one rail 312 being shown in FIG. 9, but see FIG. 11) so as to slidably receive a lower support plate 314 which dependently rigidly supports a mounting lcok 316. Suitable bearings 317 are disposed between the lower plate 314 and the guide rails 312 so as to allow relative sliding movement therebetween.

A compression spring 318 operates between the rear flange 320 and a recess 322 of the lower support plate 314 and thus biases the lower support plate 314 in a forwardly direction (i.e., leftward as viewed in FIG. 9). The force of the compression spring 318 may be adjusted by turning an adjustable threaded rod 324 so as to, in turn, adjust the amount of force absorbed by the compression spring 318. As will be appreciated, if a shock is experienced by the robot manipulator (as by abutting against another structural member during its relative advancement), the sliding interconnection between the upper and lower support plates, 304 and 314, respectively, will allow the lower support plate 314 (and hence the block 316/housing 260) to be displaced rearwardly (e.g., approximately 10 mm) against the force of the compression spring 318. The compression spring 318 thus absorbs this experienced shock and, moreover, will assist the return of the housing 260 to its "normal" forward position (i.e., as shown in FIG. 9).

The upper support plate 304 also carries a rearwardly projecting push rod 305 which is slidably recieved within a recess 307 of the upper support plate 304. A compression spring 309 housed within the recess 307 the upper support plate 304 biases the push rod 305 into its extended position as is shown in FIG. 9.

The push rod 305 is used, in the preferred embodiment of the invention, as a means to push the cassette into its seated operative position within a drive unit 20, in addition to closing the drive unit's door 22 once the cassette has been inserted. In this regard, minor shocks which may be experienced by the push rod 305 are effectivley absorbed by the compression spring 309 due to the rod's 305 sliding engagement within recess 307. To protect against major mechanical shocks (i.e., of a sufficient magnitude to drive the rod 305 into a retracted position within recess 307), there is provided a shock-absorbing plunger assembly 311 mounted above rod 305 on upper support plate 304. As is appreciated, a major impact between the rod 305 and another structure will drive the rod into recess 307, but not to an extent before the other structure contacts the plunger assembly 311 thereby preventing mechanical "crash" between the manipulator 12 and that other structure.

Figure 10:
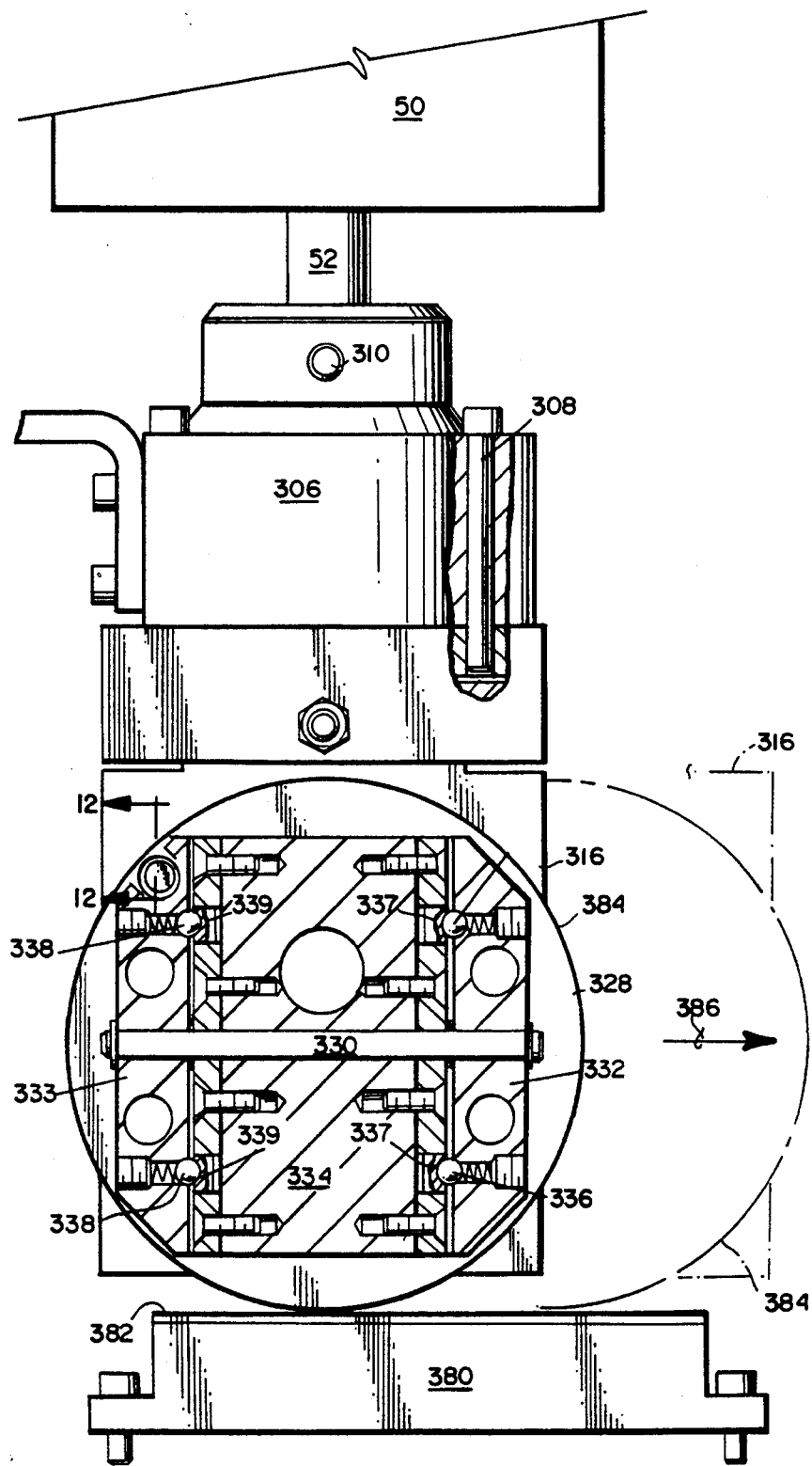
FIG. 10 is a cross-sectional front elevational view taken along line 10—10 in FIG. 9.

Minor shock absorbing capabilities are also provided by means of the interconnection of the housing structure 260 to its rearward mounting collar 328, as shown more clearly in FIG. 10. As is seen, a pivot axle 330 extends between a pair of spaced-apart flanges 332, 333 rigidly associated with the mounting collar 328. The axle 330 thus couples the rear plate 334 of the housing 260 to the flanges 332, 333 (and thus also to the mounting collar 330). Paried spring-biased ball detents 336, 338, respectively, provided with the flanges 332, 333 are urged into engagement within recesses 337, 339 formed in rear plate 334 of housing 260. A cushioning spring 340 (see FIG. 9) is positioned between the mounting collar 328 and the rear plate 334 of housing 260 and operates to urge the ball detents 336, 338 into registry and engagement with their respective recesses 337, 339, respectively. That is, spring 340 urges the rear plate 334 to pivot clockwise (as viewed in FIG. 9) about axle 330 so as to align the ball detents 336, 338 with recesses 337, 339, respectively. If a relatively minor shock is experienced, the entire housing is capable of pivoting slightly about the axle 330 towards mounting collar 328 against the force of the spring 340 (i.e., counterclockwise as viewed in FIG. 9). When the housing 260 is urged to pivot against the force of the spring 3450 (as when relatively minor shocks are experienced), the ball detents 336, 338 will be forced out of engagement with their respective recesses 337, 339. However, when the shock has subsided, the force of the spring 340 will urge the housing 260 so that it pivots into its normal position (i.e., clockwise as viewed in FIG.9)—that is, a position whereby the ball detents 336, 338 are again registered with their respective recesses 337, 339.

The mounting collar 328 is journally coupled to the support block 316 via suitable ball bearing ring 344 so as to allow the mounting collar 328 (and hence the manipulator housing 260) to be rotated about an axis 346 established by the mounting collar 328. The mounting collar 328, due to this journalled mounting to the support block 316, allows the housing 260 (and thus the finger members 262, 264) to be rotated between first and second orientations about the axis 346. In the preferred embodiment, this positional rotation of the housing 260 is important since many of the cassettes 16 are typically stored in a vertical orientation, but yet are needed to be moved into a substantially horizontal orientation before insertion into a respective drive unit 20. Therefore, the present invention allows this positional rotation so as to move the finger members 262, 264 between two different planar orientations.

The manner in which this relative rotation occurs will now be described below with reference to FIGS.

9-11. As is seen more clearly in FIG. 9, the support block 316 is provided with a locking plunger assembly 350 which is comprised of a plunger rod 352 having an upper end 353 received within a recess 354 defined within the support block 316. A compression spring 356 acts between the support block 316 and a plunger collar 358 which defines a surface 360 for accepting a position sensor 362. The other, lower end 363 of the plunger rod 356 projects from the block 316 and includes a journally mounted bearing wheel 364. A stop member 365 is rigidly attached to the plunger rod 356 and includes a downwardly turned stop 367 which is accepted within one of the stop recesses 368, 370 (only recess 368 being visible in FIG. 9, but see FIG. 11).

In the preferred embodiment shown, the stop recesses 368, 370 are oriented relative to one another so that they are circumferentially spaced apart by an angle of substantially 90°. Thus, when the stop flange 367 is engaged with recess 368, the finger members 262, 264 are in a substantially horizontal orientation (as shown in the accompanying drawings FIGURES). When, however, the stop flange 367 is engaged with stop recess 370, the finger members 262, 264 will then be in a substantially vertical orientation.

When it is desired to rotate the finger members from the horizontal orientaiton as shown e.g., in FIG. 9, to a substantially vertical orientation, the entire robot manipulator is caused to be moved via the drive column 50 and shaft 52 downwardly relative to a bearing plate structure 380 (carried forwardly of the robot platform 38—see, FIG. 1) having a bearing surface 382 of a suitable friction material (e.g., an elastomeric material or the like). This downward relative movement causes the wheel 364 of the plunger 352 to engage the surface 382 and thus responsively upwardly move the plunger against the bias force provided by the compression spring 356. This upward responsive movement of the plunger 352, in turn, disengages the stop member 365 from the stop recess 368 thereby unlocking the collar 328 (and hence the housing 260) to allow for rotation about axis 346.

Downward movement of the manipulator 12 also causes the outer cylindrical surface 384 of the mounting collar 328 to frictionally engage the surface 382 of the bearing plate 380 (see FIG. 10). It will be noted that this frictional engagement between surfaces 382 and 384 occurs only after the manipulator 12 has been downwardly moved sufficient to release the locking interengagement between the stop member 365 and the stop recess 368. In this condition, when the robot manipulator is laterally moved (i.e., in the direction of arrow 386 in FIGS. 10 and 11) the frictional engagement between the outer cylindrical surface 384 of the mounting collar 328 and the bearing surface 382 will responsively cause collar 328 to roll along surface 382 and thus rotate in a clockwise direction until it reaches a final position as shown by the phantom lines in FIGS. 10 and 11.

When the robot manipulator 12 has laterally moved sufficient to rotate the mounting collar 328 in a clockwise direction through 90°, the manipulator 12 may then be raised via drive column 50/shaft 52 so as to allow the plunger 352 to move downwardly (as viewed in FIG. 9) under the encouragement provided by the spring 356 so as to cause the stop flange 367 to be received by the other stop recess 370. In this manner, the orientation of the finger members 262, 264 may be rotated through an angle of 90°—that is, from a substantially horizontal orientation to a substantially vertical orientation. Of course, reverse operation of the sequence just described will move the orientation of the finger members from a substantially vertical position and return them to a substantially horizontal position, as may be desired.

Figure 11:
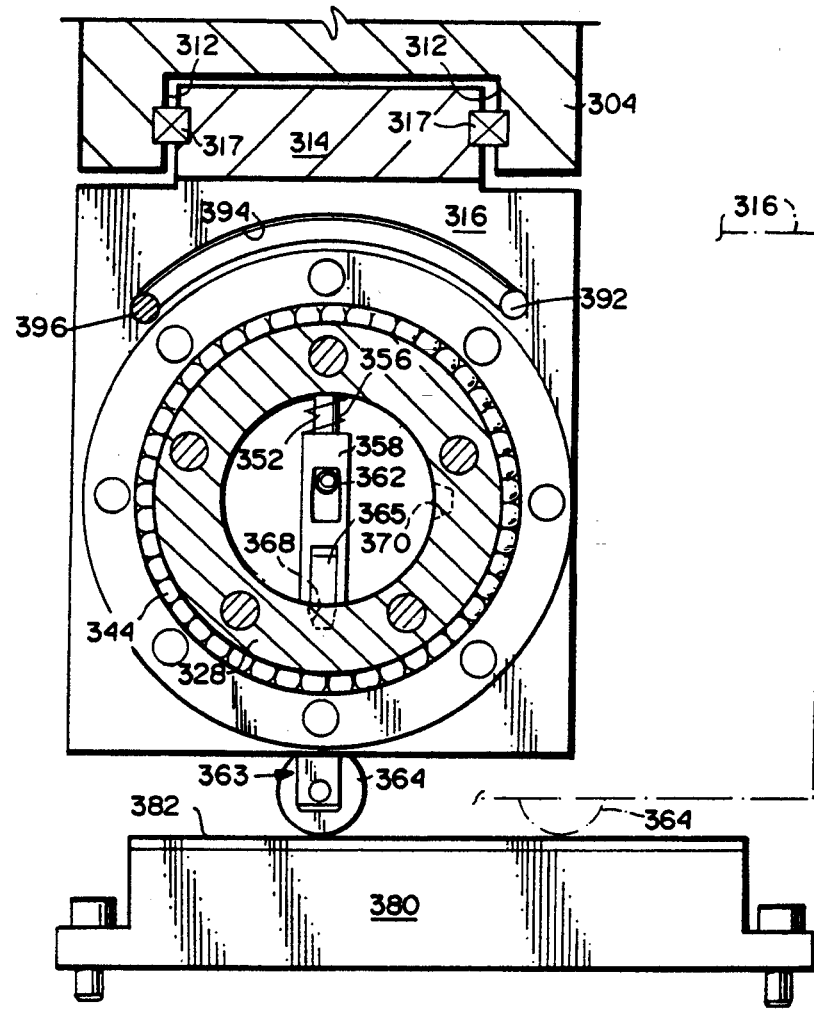
FIG. 11 is a cross-sectional front elevational view of the mounting collar for the robot manipulator as taken along line 11—11 in FIG. 9.
Figure 12:
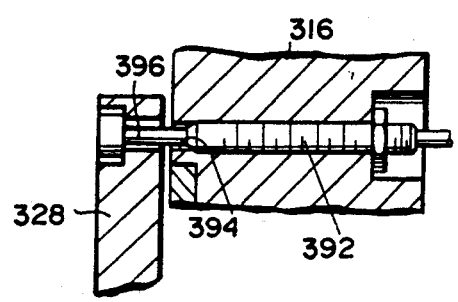
FIG. 12 is a detailed elevation view of a proximity position sensor as taken along line 12—12 in FIG. 10.

A proximity sensor 392 is provided at each end of a recessed arc 394 defined in the support block 316 as is shown in FIGS. 11 and 12. Each proximity sensor 392 is thus capable of sensing the position of a pin 396 when the pin is opposite a respective one of the sensors 392 so as to issue a position signal to the control system (not shown) and thus provide an indication of the relative orientation of the finger members 262, 264.

Figure 13:
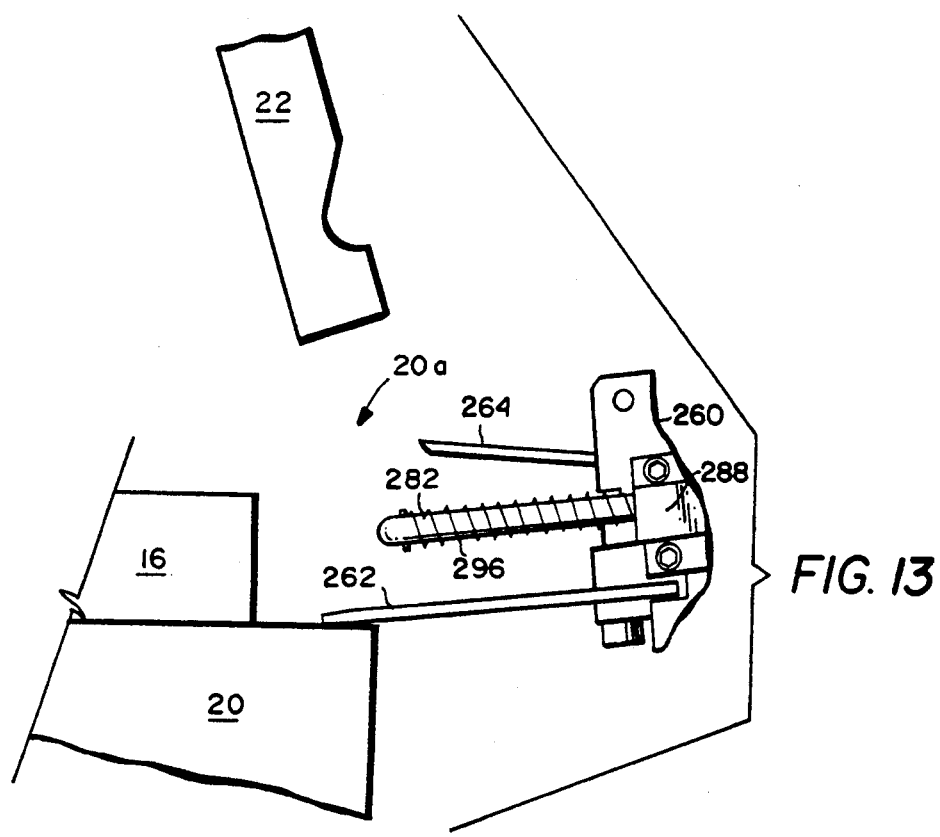
FIGS. 13-15 show schematically the physical interaction between the finger members of this invention and a cassette relative to a cassette drive.

The operation of the present invention will now be described in greateer detail with respect to FIGS. 13-16. As is shown in FIG. 13, a cassette 16 is depicted as already being positioned in a slot 20a of a cassette drive unit 20 while the robot manipulator 12 is being relatively advanced towards the cassette 16 (for example, as provided by the articulated movements between arms 46 and 48). In this state, the door 22 of the drive unit 20 is open so as to allow the finger members 262, 264 to penetrate into the slot 20a and thereby engage the tape cassette 16. The upper finger member 264 during this state has been pivoted to its released position (i.e., as shown by the solid line in FIG. 13 by energizing the actuator 268. As described briefly above, continued relative advancement of the robot manipulator 12 towards the cassette 16 causes the ejector member 284 to retract from its extended position i.e., as shown in FIG. 13) to its retracted position (i.e., as shown in FIG. 15).

Once the robot manipulator 12 has advanced towards the cassette 16 sufficient to allow the cassette 16 to be gripped by the finger members 262, 264, the actuator 268 is deenergized thereby allowing the actuator rod 270 to move upwardly (under the bias force provided by the compression spring 276) which, in turn, pivots the upper finger member 264 about axle 266 into gripping engagement with the cassette 16. This state is shown in FIG. 15.

Figure 15:
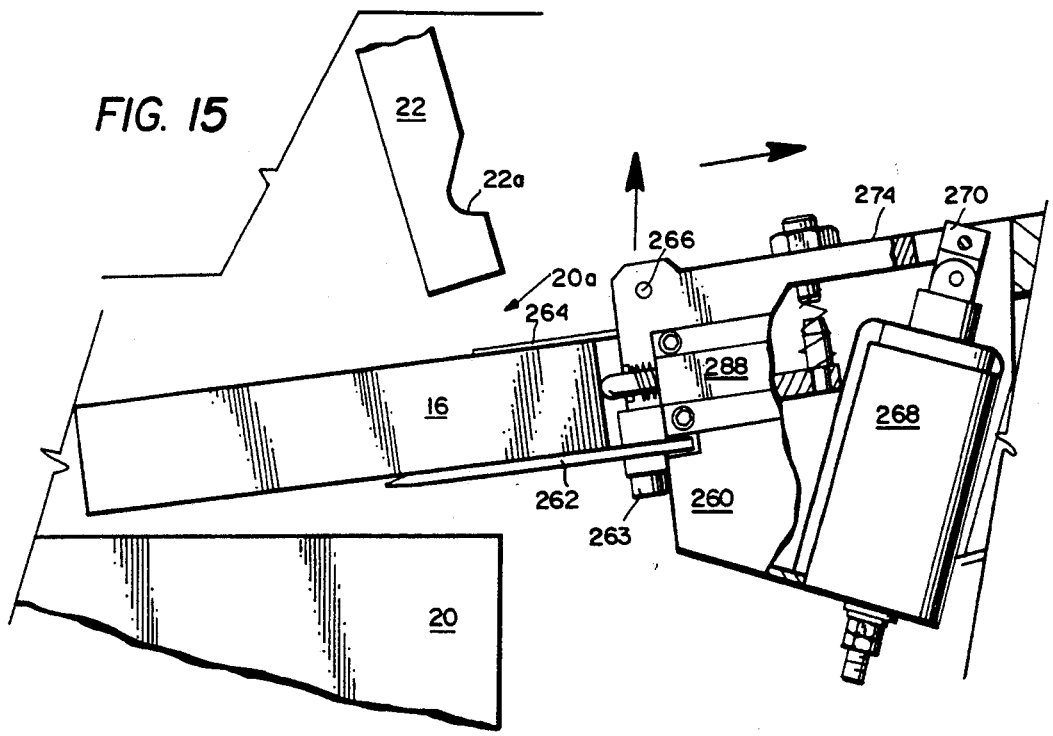

With the cassette 16 gripped between the finger members 262, 264, the robot manipulator 12 may then be moved ( for example, due to articulated relative movement between the arms 46, 48) so as to withdraw the cassette 16 from the drive units's slot 20a (i.e., in the directions of both arrows in FIG. 15.

The insertion of the cassette 16 into the slot 20a of the drive unit 20 proceeds in a reverse manner. Thus, with the tape cassette 16 gripped between the upper an lower fingers 262, 264, respectively, as shown in FIG. 15, the robot hand is advanced towards the slot 20a of the drive unit 20. This relative advancement of the robot manipulator 12 continues until the cassette 16 is initially positioned appropriately within the slot 20a of the drive unit 20, at which time the actuator 268 is energized to downwardly displace the actuator rod 270 and thereby pivot the upper finger member 264 to its released position. Upon movement of the upper finger member 264 to its released position, the energy stored in the compression springs 296, 298 of the ejector assembly 282 causes the ejector member 284 to move forwardly from its retracted position (i.e., as shown in FIG. 15) to its extended position (i.e., as shown in FIG. 13). With the cassette 16 initially placed within the drive unit 20 in the manner described, the robot manipulator 12 may then be moved away from the slot 20a.

This initial placement of cassette 16 within drive unit 20 is usually, however, insufficient to properly seat the cassette 16 for operation. In this regard, the manipulator 12 may be rotated about the axis of shaft 52 (as by means of the drive column 50) so that the push rod 305 extends towards the drive unit's slot 20a. By again advancing the manipulator 12 towards the slot 20a, the push rod 305 will be caused to contact cassette 16 thereby providing a final push to properly seat the cassette 16 for operation within the drive unit 20.

Figure 16:
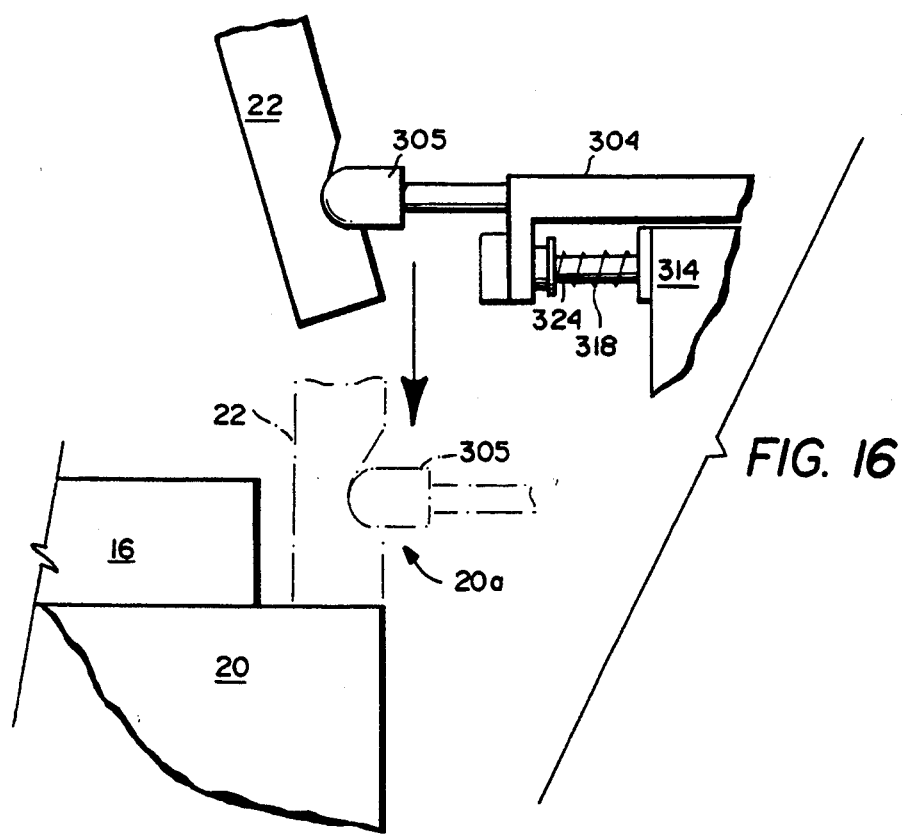
FIG. 16 shows schematically the physical interaction between the push rod and a moveable door associated with the cassette drive.
Figure 14:
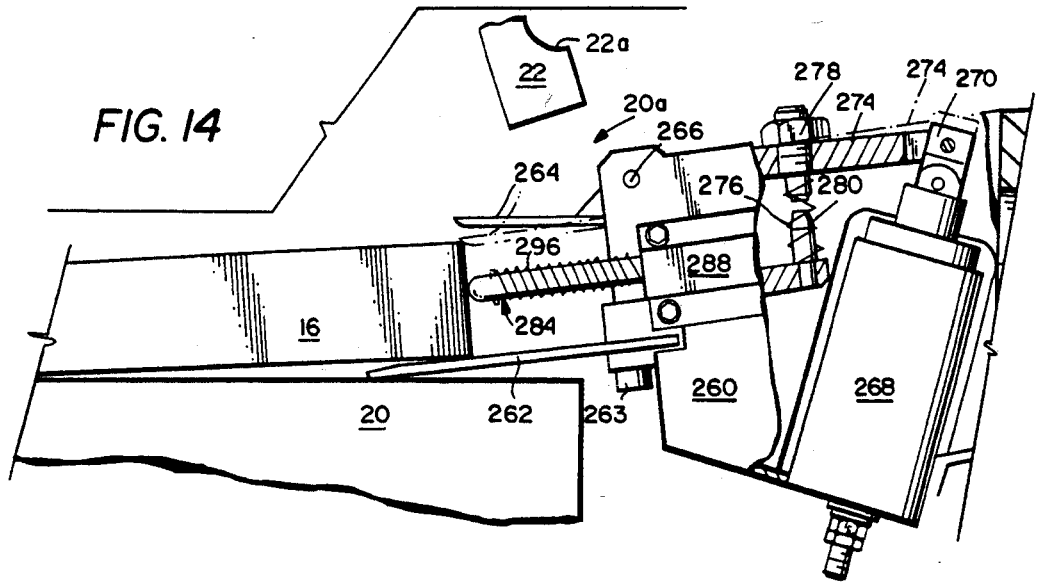

The robot manipulator 12 may then be moved so that the push rod 305 is brought into engagement with the recess surface 22a of the door 22 (as is shown by solid line in FIG. 16). By then moving the entire robot manipulator 12 downwardly (in the direction of the arrow in FIG. 16, the door 22 of the drive unit 20 may be closed.

It should be noted here that any positional inaccuracy betweent he push rod 305 and the door 22 is absorbed by virtue of the slideable mounting of the manipulator rod 305 in the upper support plate 304 and by virtue of the compression spring 318 acting on the push rod 305.

As will now undoubtedly be appreciated, the present invention provides a novel robotics sytem which is capable of operating in a variety of environments, and is especially adapted for archiving and retrieving computer data storage cassettes and operatively inserting the same within cassette drive units. Thus, while the invention has been described in connection with what is presently considered to be the most practical and preferred embodiment, it is to be understood that the invention is not to be limited to the disclosed embodiment, but one the contrary, is intended to cover various modifications and equivalent arrangements included within the spirit and scope of the appended claims.

What is claimed is:

1. An automated archiving and retrieval system for computer data storage cassettes comprising:
    a cassette library for archiving a number of data storage cassettes during periods of nonuse;
    at least one cassette drive unit having a slot sized to accept a data storage cassette therewithin;
    a robotic manipulator for (i) gripping and removing a preselected data storage cassette from said cassettte library, (ii) transporting said gripped preselected data storage cassette from said cassette library to said at least one drive unit, (iii) orienting said gripped preselected data storage cassette into alignment with said slot of said at least one drive unit, and (iv) inserting and releasing said preselected data storage cassette within said slot of said at least one drive unit, wherein said robotic manipulator includes;
    foot structure disposed on a ground surface;
    a robot support mounted upon said foot structure for vertical movements relative to said ground surface between raised and lowered positions; and
    a robot mounted upon said robot support so as to be carried thereby between said raised and lowered positions thereof, said robot including:
      (a) a first drive mounted upon said robot support;
      (b) a proximal arm radially extending from said first drive and connected thereto for articulated movements about a first axis;
      (c) a distal arm connected to said proximal arm for relative pivotal movements about a second axis;
      (d) a support element connected to a terminal end of said distal arm for relative pivotal movements about a third axis;
      (e) a manipulator hand connected to said support element, said manipulator hand comprising:
        a gripper having a gripped position for gripping a preselected cassette to allow said cassette to be transported between said cassette library and said cassette drive, and a released position for releasing said cassette to allow said cassette to be inserted into said input slot of said cassette drive, wherein
        said gripper includes a housing, and a pair of separated finger members establishing a space therebetween mounted to said housing, at least one of said finger members being movable relative to another of said finger members so as to effect said gripped and released positions; and an ejector movable between a retracted position and an extended position for ejecting said cassette into said input slot when said gripper is in said released position, and wherein
    said system further comprises;
    a positioning control system operatively coupled to said robotic manipulator for effecting movement of said gripper between a first position of said data storage cassette whereby said gripper may be aligned with and adapted to grip said cassette when stored in said cassette library, and a second position of said data storage cassette whereby said cassette may be aligned with said input slot of said cassette drive.

2. An automated archiving and retrieval system for computer data storage cassettes comprising:
    a cassette library for archiving a number of data storage cassettes during periods of nonuse;
    at least one cassette drive unit having a slot sized to accept a data storage cassette therewithin;
    a robotic manipulator for (i) gripping and removing a preselected data storage cassette from said cassette library, (ii) transporting said gripped preselected data storage cassette from said cassette library to said at least one drive unit, (iii) orienting said gripped preselected data storage cassette into alignment with said slot of said at least one drive unit, and (iv) inserting and releasing said preselected data storage cassette within said slot of said at least one drive units, wherein said robotic manipulator includes:
    foot structure disposed on a ground surface;
    a robot support mounted upon said foot structure for vertical movements relative to said ground surface between raised and lowered positions; and
    a robot mounted upon said robot support so as to be carried thereby between said raised and lowered positions thereof, said robot including;
      (a) a first drive mounted upon said robot support;
      (b) a proximal arm radially extending from said first drive and connected thereto for articulated movements about a first axis;
      (c) a distal arm connected to said proximal arm for relative pivotal movements about a second axis;
      (d) a second drive connected to said distal arm for effecting articulated movements thereof about a second axis;
      (e) a support member connected to a terminal end of said distal arm for relative pivotal movements about a third axis;

(f) a third drive connected to a terminal end of said distal arm for effecting said relative pivotal movements of said support member about said third axis; and (g) a manipulator hand connected to said support member, said manipulator hand comprising;

(1) a cassette manipulator for (i) gripping said data storage cassette so as to allow said cassette to be transported from said cassette library site to said cassette drive unit, (ii) orienting said gripped cassette into alignment with said slot of said cassette drive unit, (iii) inserting said oriented and aligned cassette into said slot of said cassette drive unit, and (iv) releasing said cassette within said slot of said cassette drive unit; and (2) a pusher for contacting and pushing said released cassette into a receptive position within said cassette drive unit.

3. An automated archiving and retrieval system for computer data storage cassettes comprising:

a cassette library for archiving a number of data storage cassettes during periods of nonuse;

at least one cassette drive unit having a slot sized to accept a data storage cassette therewithin;

a robotic manipulator for (i) gripping and removing a preselected data storage cassette from said cassette library, (ii) transporting said gripped preselected data storage cassette from said cassette library to said at least one drive unit, (iii) orienting said gripped preselected data storage cassette into alignment with said slot of said at least one drive unit, and (iv) inserting and releasing said preselected data storage cassette within said slot of said at least one drive unit, wherein said robotic manipulator means includes:

foot structure disposed on a ground surface;

a robot support mounted upon said foot for vertical movements relative to said ground surface between raised and lowered positions; and a robot mounted upon said robot support so as to be carried therby between said raised and lowered positions thereof, said robot including:

(a) a first drive mounted upon said robot support;

(b) a proximal arm radially extending from said first drive and connected thereto for articulated movements about a first axis;

(c) a distal arm connected to said proximal arm for relative pivotal movements about a second axis;

(d) a support element connected to a terminal end of said distal arm for relative pivotal movements about a third vertical axis;

(e) a manipulator hand connected to said support element, said manipulator hand comprising:

a gripper having a gripped position for gripping a preselected cassette to allow said cassette to be transported between said cassette library and said cassette drive, and a released position for releasing said cassette to allow said cassette to be inserted into said input slot of said cassette drive, wherein said gripper includes a housing, and a pair of separated finger members establishing a space therebetween mounted to said housing, at least one of said finger members being moveable relative to another of said finger members so as to effect said gripped and released positions;

a positioning control system operatively coupled to said robotic manipulator for effecting movements of said gripper between a first essentially vertical position of said data storage cassette whereby said gripper may be aligned with and adapted to grip said cassette when stored in said cassette library, and a second essentially horizontal position of said data storage cassette whereby said cassette may be aligned with said input slot of said cassette drive; and an ejector movable between a retracted position and an extended position for ejecting said cassette into a location in which said cassette is to be deposited when said gripper is in said released position.

4. An automated archiving and retrieval system for computer data storage cassettes comprising:

a cassette library for archiving a number of data storage cassettes during periods of nonuse;

at least one cassette drive unit having a slot sized to accept a data storage cassette therewithin;

a robotic manipulator for (i) gripping and removing a preselected data storage cassette from said cassette library, (ii) transporting said gripped preselected data storage cassette from said cassette library to said at least one drive unit, (iii) orienting said gripped preselected data storage cassette into alignment with said slot of said at least one drive unit, and (iv) inserting and releasing said preselected data storage cassette within said slot of said at least one drive unit, wherein said robotic manipulator means includes:

foot structure disposed on a ground surface;

a robot support mounted upon said foot structure for vertical movements relative to said ground surface between raised and lowered positions; and a robot mounted upon said robot support so as to be carried thereby between said raised and lowered positons thereof, said robot inlcuding:

(a) a first drive mounted upon said robot support;

(b) a proximal arm radially extending from said first drive and connected thereto for articulated movements about a first axis;

(c) a distal arm connected to said proximal arm for relative pivotal movements about a second axis;

(d) a support element connected to a terminal end of said distal arm for relative pivotal movements about a third axis;

(e) a manipulator hand connected to said support shaft, said manipulator hand comprising:

a gripper having a gripped position for gripping a preselected cassette to allow said cassette to be transported betweeen said cassette library and said cassette drive and a released position for releasing said cassette to allow said cassette to be inserted into said input slot of said cassette drive; wherein said gripper includes a housing, and a pair of separated finger members establishing a space therebetween mounted to said housing, at least one of said finger members being movable relative to another of said finger members so as to effect said gripped and released positions;

a positioning control system operatively coupled to said robotic manipulator for effecting movement thereof between a first position of said data storage cassette whereby said gripper may be aligned with and adapted to grip said cassette when stored in said cassette library, and a second position of said data storage cassette whereby said cassette may be aligned with said input slot of said cassette drive; and a shock absorber for allowing the gripper to be rearwardly displaced in response to said pair of finger members experiencing a shock against a forward end thereof.

5. An automated archiving and retrieval system for computer data storage cassettes comprising:

a cassette library for archiving a number of data storage cassettes during periods of nonuse;

at least one cassette drive unit having a slot sized to accept a data storage cassette therewithin;

a robotic manipulator for (i) gripping and removing a preselected data storage cassette from said cassette library, (ii) transporting said gripped preselected data storage cassette from said cassette library to said at least one drive unit, (iii) orienting said gripped preselected data storage cassette into alignment with said slot of said at least one drive unit and (iv) inserting and releasing said preselected data storage cassette within said slot of said at least one drive unit, wherein said robotic manipulator includes;

a horizontally disposed track for establishing a conveyance path between said cassette library and said at least one drive unit;

a carriage reciprocally movable along said track between said cassette library and said at least one drive unit;

a robot support mounted upon said carriage for vertical movements relative to said track between raised and lowered positions; and a robot mounted upon said robot support so as to be carried thereby between said raised and lowered positions thereof, said robot including;

(a) a first drive mounted upon said robot support;

(b) a proximal arm radially extending from said first drive and connected thereto for articulated movements abut a first axis;

(c) a distal arm connected to said proximal arm for relative pivotal movments about a second axis;

(d) a support element connected to a terminal end of said distal arm for relative pivotal movements about a third axis;

(e) a manipulator hand connected to said support element and having a gripped condition for gripping said preselected cassette to allow said preselected cassette to be transported from said cassette library to said at least one drive unit, and a released condition to allow said cassette to be released within said slot of said at least one drive unit, and (f) a control unit for controlling movements of said manipulator hand such that said manipulator hand is caused to grip said preselected cassette in said cassette library and insert said preselected cassette into said slot of said at least one drive unit.

6. An automated archiving and retrieval system for computer data storage cassettes comprising:

a cassette library for archiving a number of data storage cassettes during periods of nonuse;

at least one cassette drive unit having a slot sized to accept a data storage cassette therewithin;

a robotic manipulator for (i) gripping and removing a preselected data storage cassette from said cassette library, (ii) transporting said gripped preselected data storage cassette from said cassette library to said at least one drive unti, (iii) orienting said gripped preselected data storage cassette into alignment with said slot of said at least one drive unit, and (iv) inserting and releasing said preselected data storage cassette within said slot of said at least one drive unit, wherein said robotic manipulator includes;

a track for establishing a conveyance path between said cassette library and said at least one drive unit;

a carriage reciprocally movable along said track between said cassette library and said at least one drive unit;

a robot support mounted upon said carriage means for vertical movements relative to said track means between raised and lowered positions; and a robot mounted upon said robot support so as to be carried thereby between said raised and lowered positions thereof, said robot including:

(a) a first drive mounted upon said robot holding means;

(b) a proximal arm radially extending from said first drive and connected thereto for articulated movements about a first axis;

(c) a distal arm connected to said proximal arm for relative pivotal movements about a second axis;

(d) a support element connected to a terminal end of said distal arm for relative pivotal movements about a third axis;

(e) a manipulator hand connected to said support element and having a gripped condition for gripping said preselected cassette to allow said preselected cassette to be transported from said cassette library to said at least one drive unit, and a released condition to allow said cassette to be released within said slot of said at least one drive unit, and (f) a control unit for controlling movements of said manipulator hand to insert said preselected cassette operatively within said slot of said at least one drive unit and to subsequently cause said manipulator hand to push the cassette into its operative position within said drive unit.

7. A system for the automated retrieval of data storage cassettes, said system comprising, in combination;

a cassette library for storing a number of said data storage cassettes during periods of nonuse;

at least one cassette drive unit spaced from said cassette library and including an input slot to allow a preselected cassette to be operatively inserted into said cassette drive unit;

robot transport means operatively movable between said cassette library and said at least one cassette drive unit so as to transport said preselected cassette therebetween, wherein said robot transport means includes (i) a horizontal track disposed alongside said cassette library and said at least one cassette drive unit for establishing a path therebetween;

(ii) carriage means operatively coupled to said track for movements along said established path between said cassette library and said at least one cassette drive unit;

(iii) robot holding means mounted upon said carriage means and being vertically movable relative thereto between raised and lowered positions;

(iv) hoist means operatively connected to said robot holding means for moving said platform means between said raised and lowered positions; and (v) a robot mounted upon said robot holding means so as to be movable thereby between said raised and lowered positions, said robot including;

(a) a first drive column mounted upon said robot holding means;

(b) a proximal arm member radially extending from, and connected to, said first drive column to allow for relative articulated movements therebetween about a first axis;

(c) a distal arm member connected to said proximal arm member to allow for relative articulated movements therebetween about a second axis;

(d) said distal arm member at a terminal end thereof having a support element rotatable about a third axis with respect to said distal arm member;

(e) a manipulator hand connected to said support element, wherein said manipulator hand includes, (1) a pair of opposed finger members defining therebetween a space sized to accept a cassette therein;

(2) mounting means for mounting said pair of finger members to allow rotation thereof between first and second orientations to allow said pair of finger members to be aligned as needed with said cassettes in said cassette library and said input slot of said at least one cassette drive, respectively;

(3) said mounting means also including means allowing pivotal movements of at least one of said finger members relative to another of said finger member so as to effect a gripped position whereby a cassette may be griped between said pair of finger members and thus held in said defined space, and a released position whereby said cassette may be ejected from said defined space, and (4) article ejection means operatively disposed in said defined space and movable between a retracted position when said cassette is held by means of said finger members in said defined space, and an extended position when said cassette is to be ejected from said defined space.

8. An automated archiving and retrieval system for computer data storage cassettes comprising:

a cassette library for archiving a number of data storage cassettes during periods of nonuse;

at least one cassette drive unit having a slot sized to accept a data storage cassette therewithin;

robotic manipulator means for (i) gripping and removing a preselected data storage cassette from said cassette library, (ii) transporting said gripped preselected data storage cassette from said cassette library to said at least one drive unit, (iii) orienting said gripped preselected cassette into alignment with said slot of said at least one drive unit, and (iv) inserting and releasing said preselected cassette within said slot of said at least one drive unit, wherein said robotic manipulator means includes:

foot means disposed on a ground surface;

a robot holding means mounted upon said foot means for vertical movements relative to said ground surface between raised and lowered positions; and a robot mounted upon said robot holding means so as to be carried thereby between said raised and lowered positions thereof, said robot including:

(a) a first drive column mounted upon said robot holding means;

(b) a proximal arm radially extending from said first drive column and connected thereto for articulated movements about a first axis;

(c) a distal arm connected to said proximal arm for relative pivotal movements about a second axis;

(d) a support member connected to a terminal end of said distal arm for relative pivotal movements about a third axis;

(e) said first, second and third axis being oriented parallel with respect to each other;

(f) a manipulator hand connected to said support shaft, said manipulator hand comprising:

gripping means having a gripped position for gripping a preselected cassette to allow said cassette to be transported betweeen said cassette library and said cassette drive, and a released position for releasing said cassette to allow said cassette to be inserted into said input slot of said cassette drive;

said gripping means including a housing, and a pair of separated finger members establishing a space therebetween mounted to said housing, at least one of said finger members being movable relative to another of said finger members so as to effect said gripped and released positions;

positioning means operatively coupled to said gripping means for effecting movement thereof between a first essentially vertical position of said data storage cassette whereby said gripping means may be aligned with and adapted to grip said cassette when sorted in said cassette library, and a second essentially horizontal position of said data storage cassette whereby said cassette may be aligned with said input slot of said cassette drive.

9. An automated computer data storage cassette archiving and retrieval system comprising in combination:

a data storage cassette library for archiving a number of computer data storage cassettes;

at least one computer cassette drive unit spaced from said cassette library, said drive unit including an input slot sized and configured so as to accept therewithin a preselected one of said cassettes transported thereto from said cassette library; and robot transport means operating between said tape cassette library and said at least one computer cassette drive unit for retrieving said preselected cassette from said cassette library and inserting said preselected cassette directly into said input slot of said at least one drive unit, and for withdrawing said cassette from said input slot of said at least one drive unit and returning said cassette to said cassette library, said robot transport means including:

(i) track means establishing a path between said cassette library and said at least one drive unit;

(ii) robot carriage means operatively coupled to said track means for movements along said established path between said cassette library and said at least one drive unit;

(iii) robot manipulator means carried by said robot carriage means for movements therewith along said established path, said robot manipulator means fopr grasping a cassette to allow for transport thereof between said cassette library and said at least one drive unit; and (iv) a robot manipulator hoist means mounted to said carriage means for vertical movements of said robot manipulator means between raised and lowered positions relative to said carriage means, and wherein said robot manipulator means includes:

a manipulator hand including gripping means for gripping and releasing said preselected data storage cassette so that said preselected data storage cassette may be conveyed with said carriage means between said cassette library and said at least one cassette drive unit;

operating means for operating said gripping means so that said preselected cassette is gripped thereby in said cassette library and removed from said cassette library; and ejector means for ejecting said cassette from said robotic manipulator and placement of said cassette into said input slot of said cassette drive unit by pushing said cassette in a forward direction straight into said slot.

10. An automated computer data storage cassette archiving and retrieval system comprising in combination:

a data storage cassette library for archiving a number of computer data storage cassettes;

at least one computer cassette drive unit spaced from said cassette library, said drive unit including an input slot sized and configured so as to accept therewithin a preselected one of said cassettes transported thereto from said cassette library; and a robot operating between said tape cassette library and said at least one computer cassette drive unit for retrieving said preselected cassette from said cassette library and inserting said preselected cassette directly into said input slot of said at least one drive unit, and for withdrawing said cassette from said input slot of said at least one drive unit and returning said cassette to said cassette library, wherein said robot includes:

(i) a track establishing a path between said cassette library and said at least one drive unit;

(ii) a robot carriage operatively coupled to said track for movements along said established path between said cassette library and said at least one drive unit;

(iii) a robot manipulator carried by said robot carriage for movements therewith along said established path, said robot manipulator for grasping a cassette to allow for transport thereof between said cassette library and said at least one drive unit; and wherein said robot manipulator includes:

a gripper having a gripped position for gripping a preselected cassette to allow said cassette to be transported between said cassette library and said cassette drive, and a released position for releasing said cassette to allow said cassette to be inserted into said input slot of said cassette drive;

said gripper including a housing, and a pair of separated finger members establishing a space therebetween mounted to said housing, at least one of said finger members being movable relative to another of said finger members so as to effect said gripped and released positions;

a positioning control operatively coupled to said robot for effecting movement of said gripper between a first position of said data storage cassette whereby said gripper may be aligned with and adapted to grip said cassette when stored in said cassette library, and a second position of said data storage cassette whereby said cassette may be aligned with said input slot of said cassette drive; and an ejector movable between a retracted position and an extended position for ejecting said cassette into said input slot when said gripper is in said released position.

11. An automated computer data storage cassette archiving and retrieval system compirsing in combination:

a data storage cassette library for archiving a number of computer data storage cassettes;

at least one computer cassette drive unit spaced from said cassette library, said drive unit including an input slot sized and configured so as to accept therewithin a preselected one of said cassettes transported thereto from said cassette library; and a robot operating between said tape cassette library and said at least one computer cassette drive nit for retrieving said preselected cassette from said cassette library and inserting said preselected cassette directly into said input slot of said at least one drive unit, and for withdrawing said cassette from said input slot of said at least one drive unit and returing said cassette to said cassette library, wherein said robot includes:

(i) a track establishing a path between said cassette library and said at least one drive unit;

(ii) a robot carriage operatively coupled to said track for movements along said established path between said cassette library and said at least one drive unit;

(iii) a robot manipulator carried by said robot carriage for movements therewith along said established path, said robot manipulator for grasping a cassette to allow for transport thereof between said cassette library and said at leas tone drive unit; and wherein said robot manipulator includes:

a pair of forwardly extending finger members , which are separated from one another to establish a space adapted to accept a data storage cassette therewithin, at least one said finger member being pivotal relative to another of said finger members to allow for movements between a gripped position whereby a data storage cassette is gripped between said pair of finger members, and a released position whereby said data storage cassette may be accepted within, and ejected from, said established space;

at least one controlled rotational axis for orienting said finger members, and hence a cassette gripped thereby, relative to the input slot of the cassette drive unit such that said gripped cassette is aligned with said input slot; and a cassette ejector operatively acting upon said cassette for ejecting said cassette from said established space forwardly of said finger members when said pair of finger members are in said released position so as to prevent said cassette from hanging onto said finger members.

12. An automated computer data storage cassette archiving and retrieval system comprising in combination:

a data storage cassette library for archiving a number of computer data storage cassettes;

at least one computer cassette drive unit spaced from said cassette library, said drive unit including an input slot sized and configured so as to accept therewithin a preselected one of said cassettes tranposrted thereto from said cassette library; and a robot operating between said tape cassette library and said at least one computer cassette drive unit for retrieving said preselected cassette from said cassette library and inserting said preselected cassette directly into said input slot of said at least one drive unit, and for withdrawing said cassette from said input slot of said at least one drive unit and returning said cassette to said cassette library, wherein said robot includes:
(i) a track establishing a path between said cassette library and said at least one drive unit;
(ii) a robot carriage operatively coupled to said track for movements along said established path between said cassette library and said at least one drive unit;
(iii) a robot manipulator carried by said robot carriage for movments therewith along said established path, said robot manipulator for grasping a cassette to allow for transport thereof between said cassette library and said at least one drive unit; and wherein said robot manipulator includes:
a gripper having a gripped position for gripping a preselected cassette to allow said cassette to be transported between said cassette library and said cassette drive, and a released position for releasing said cassette to allow said cassette to be inserted into said input slot of said cassette drive; wherein said gripper includes a housing, and a pair of separated finger members estalishing a space therebetween mounted to said housing, at least one of said finger members being movable relative to another of said finger members so as to effect said gripped and released positions;

a positioning system operatively coupled to said gripper for effecting movement thereof between a first essentially vertical position of said data storage cassette whereby said gripper may be aligned with and adapted to grip said cassette when stored in said cassette library, and a second essentially horizontal position of said data storage cassette whereby said cassette may be aligned with said input slot of said cassette drive; and an ejector movable between a retracted position and an extended position for ejecting said cassette into a location in which said cassette is to be received when said gripper is in said released position.

13. An automated computer data storage cassette archiving and retrieval system comprising in combination:

a data storage cassette library for archiving a number of computer data storage cassettes;

at least one computer cassette drive unit spaced from said cassette library, said drive unit including an input slot sized and configured so as to accept therewithin a preselected one of said cassettes transported thereto from said cassette library; and a robot operating between said tape cassette library and said at least one computer cassette drive unit for retrieving said preselected cassette from said cassette library and inserting said preselected cassette directly into said input slot of said at least one drive unit, and for withdrawing said cassette from said input slot of said at least one drive unit and returning said cassette to said cassette library, wherein said robot includes:
(i) a horizontal track establishing a path between said cassette library and said at least one drive unit;
(ii) a robot carriage operatively coupled to said track means for movements along said established path between said cassette library and said at least one drive unit;
(iii) a robot manipulator carried by said robot carriage for movements therewith along said established path, said robot manipulator for grasping a cassette to allow for transport thereof between said cassette library and said at least one drive unit; and wherein said robot manipulator includes:
a manipulator hand including a gripper for gripping and releasing said preselected data storage cassette so that said preselected data storage cassete may be conveyed with said carriage means between said cassette library and said at least one cassette drive unit, and wherein a drive for operating said gripper so that said preselected cassette is gripped thereby in said cassette library and removed from said cassette library, and a shock absorber for allowing the gripper to be rearwardly displaced in response to said gripper experiencing a shock against a forward end thereof.

14. An automated computer data storage cassette archiving and retrieval system comprising in combination:

a data storage cassette library for archiving a number of computer data storage cassettes;

at least one computer cassette drive unit spaced from said cassette library, said drive unit including an input slot sized and configured so as to accept therewith a preselected one of said cassettes transported thereto from said cassette library; and robot transport means operating between said tape cassette library and said at least one computer cassette drive unit for retrieving said preselected cassette from said cassette library and inserting said preselected cassette directly into said input slot of said at least one drive unit, and for withdrawing said casset from said input slot of said at least one drive unit and returing said cassette to said cassette library, wherein said robot transport means includes:
  (i) track means establishing a path between said cassette library and said at least one drive unit;
  (ii) robot carriage means operatively coupled to said track means for movements along said established path between said cassette library and said at least one drive unit;
  (iii) robot manipulator means carried by said robot carriage means for movements therewith along said established path, said robot manipulator means for grasping a cassette to allow for transport thereof between said cassette library and said at least one drive unit; and wherein said robot manipulator means includes:
  gripping means having a gripped position for gripping a preselected cassette to allow said cassette to be transported between said cassette library and said cassette drive, and a released position for releasing said cassette to allow said cassette to be inserted into said input slot of said cassette drive;
  said gripping means including a housing, and a pair of separated finger members establishing a space therebetween mounted to said housing, at least one of said finger members being movable relative to another of said finger members so as to effect said gripped and released positions;
  positioning means operatively coupled to said gripping means for effecting movement thereof between a first position of said data storage cassette whereby said gripping means may be aligned with and adapted to grip said cassette when stored in said cassette library, and a second position of said data storage cassette whereby said cassette may be aligned with said input slot of said cassette drive; and
  shock absorbing means for allowing the finger members to be rearwardly displaced in response to said pair of finger members experiencing a shock against a forward end therof.

15. An automated computer data storage cassette archiving and retrieval system comprising in combination:
  a data storage cassette library for archiving a number of computer data storage cassettes;
  at least one computer cassette drive unit spaced from said cassette library, said drive unit including an input slot sized and configured so as to accept therewithin a preselected one of said cassettes transported thereto from said cassette library; and
  a robot operating between said tape cassette library and said at lest one computer cassette drive unit for retrieving said preselected cassette from said cassette library and inserting said preselected cassette directly into said input slot of said at least one drive unit, and for withdrawing said cassette from said input slot of said at least one drive unit and returning said cassette to said cassette library, wherein said robot includes:
  (i) a track establishing a path between said cassette library and said at least one drive unit;
  (ii) a robot carriage operatively coupled to said track for movements along said established path between said cassette library and said at least one drive unit;
  (iii) a robot manipulator carried by said robot carriage for movements therewith along said established path, said robot manipulator for grasping a cassette to allow for transport thereof between said cassette library and said at least one drive unit; and
  (iv) a robot manipulator lifter mounted to said carriage means for movements of said robot manipulator between raised and lowered positions relative to said carriage means, and wherein said robot manipulator includes:
  a pair of forwardly extending finger members which are separated from one another to establish a space adapted to accept a data storage cassette therewithin, at least one said finger member being pivotal relative to another of said finger members to allow for movements between a gripped position whereby a data storage cassette is gripped between said pair of finger members, and a released position whereby said data storage cassette may be accepted within, and ejected from said established space;
  at least one controlled rotational axis for orienting said finger members, and hence a cassette gripped thereby, relative to the input slot of the cassette drive unit such that said gripped cassette is aligned with said input slot; and
  a shock absorber for allowing the finger members to be rearwardly displaced in response to said pair of finger members experiencing a shock against a forward end thereof.

16. An automated system as in claim 15, wherein said shock absorber includes guide rail mounting structure for mounting said housing to permit reciprocal rectilinear displacements between forward and rearward positions, and a spring for exerting a bias force on said housing so that said housing is normally in said forward position, yet allowing said housing to be resiliently displaced rearwardly against the bias force thereof to thereby absorb shock.

17. An automated archiving and retrieval system for computer data storage cassettes comprising:
  a cassette library for archiving a number of data storage cassettes during periods of nonuse, said cassette library storing said computer data storage cassette in a vertically oriented position, said cassette library comprising a shelf extending in a longitudinal direction, said shelf comprising horizontal rows extending in said longitudinal direction for containing said data storage cassettes,
  a plurality of cassette drive units associated with a computer system, each of said drive units having an input slot sized to accept a data storage cassette therewithin, said data storage cassette being oriented in a horizontal direction when inserted into said input slot, and
  a transport system which includes:
  a) a track disposed on a ground surface and having an associated gear rack, said track defining a path between said cassette library and said drive unit, said track comprising two parallel track members which are arranged adjacent said drive unit and said cassette library and extending in said longitudinal direction thereof;

b) a carriage assembly supported by said track members and capable of reciprocal rectilinear movements along said path between the cassette library and said drive units, said carriage assembly having a reversible electric motor which includes a pinion gear meshed with said gear rack associated with said track, c) a manipulator hand, d) a handling system for positioning said manipulator hand, said handling system being mounted on said carraige assembly, said handling system having at least six computer controlled axes of movement for positioning said manipulator hand, at least four axes of said six axes being rotary axes, one of said rotary axes being oriented vertical with respect to said carriage assembly and another of said rotary axes connecting said manipulator hand with said handling system, wherein said manipulator hand comprises:
    a gripper having a gripped position for gripping a preselected cassette to allow said cassette to be transported between said cassette library and one of said cassette drive units, and a released position for releasing said cassette to allow said cassette to be inserted into said input slot of said cassette drive unit;
    said gripper including a housing, and a pair of separated finger members establishing a space therebetween mounted to said housing, at least one of said finger members being movable relative to another of said finger members so as to effect said gripped and released positions;
    said gripper including an actuator connected operatively to said at least one finger member so as to pivotally move said at least one finger member between said gripped and released positions; and wherein said transport system further includes, e) a control system so as to achieve precise predetermined movements of said manipulator hand relative to said data storage cassette and relative to said cassette library and said drive units thereby allowing said system to (1) grip and retrieve said preselected one of said data storage cassettes in said cassette library, (2) remove said gripped preselected data storage cassette from said cassette library, (3) transport said gripped preselected data storage cassette from said cassette library to one of said drive units, (4) orient said gripped preselected data storage cassette into alignment with said input slot of said drive unit, and (5) insert and release said preselected data storage cassette within said slot of said drive unit.

18. An automated archiving and retrieval system according to claim 17 wherein said gripper further includes a pusher for contacting and pushing said released cassette into a defined position within said cassette drive unit.

19. An automated archiving and retrieval system according to claim 17 wherein said gripper further includes an ejector movable between a retracted position and an extended position for ejecting said cassette into said input slot when said gripper is in said released position.

20. An automated archiving and retrieval system according to claim 19 wherein said gripper further includes an ejector drive for moving said ejector relative to said space established between said pair of finger members to permit said ejector to be reciprocally movable between said extended and retracted positions.

21. An automated archiving and retrieval system according to claim 20, wherein said ejector is in said retracted position when said cassette is gripped by means of said pair of fingers in said gripped position, and is moved into said extended position when said cassette is to be ejected from said space when said pair of finger members is in said released position.

22. An automated archiving and retrieval system according to claim 20, wherein said ejector drive includes a spring for forcibly moving said ejector from said retracted position and into said extended position.

23. An automated archiving and retrieval system according to claim 19, wherein said ejector is operatively disposed in said space established between said pair of separated finger members for ejecting said cassette therefrom when said pair of finger members is in said released position.

24. An automated archiving and retrieval system according to claim 19, wherein said ejector includes a biasing member for forcibly moving said ejector from said retracted position and into said extended position.

25. An automated archiving and retrieval system according to claim 17 wherein said manipulator hand further comprises a shock absorber to prevent structural crash between said manipulator hand and equipment with which it interacts.

26. An automated archiving and retrieval system according to claim 25, wherein said shock absorber further comprises an elastic member for allowing said finger members to be rearwardly displaced in response to said pair of finger members experiencing a shock against a forward end thereof.

27. An automated archiving and retrieval system according to claim 17, wherein said gripper further comprises a shock absorber for allowing said finger members to be rearwardly displaced in response to said pair of finger members experiencing a shock against a forward end thereof.

28. An automated archiving and retrieval system for computer data storage cassettes comprising:
    a cassette library for archiving a number of data storage cassettes during periods of nonuse, said cassette library storing said computer data storage cassette in a vertically oriented position, said cassette library comprising a shelf extending in a longitudinal direction, said shelf comprising horizontal rows extending in said longitudinal direction for containing said data storage cassettes;
    at least one cassette drive unit, said cassette drive unit being associated with a computer system, said cassette drive unit having an input slot sized to accept a data storage cassette therewithin, said data storage cassette being oriented in horizontal direction when inserted into said input slot; and
    a transport system which includes:
        a) a track disposed at a ground surface and defining a path along said longitudinal direction of said cassette library and alongside said drive unit, said track including a subfloor spaced below said ground surface, two parallel track members which are arranged adjacent the cassette library and said drive unit, a gear rack, and support elements disposed on said subfloor for supporting said two track members at said ground surface,
b) a carriage assembly supported by said track members and capable of reciprocal rectilinear movements along said path between the cassette library and said drive units, said carriage assembly having a reversible electric motor which includes a pinion gear meshed with said gear rack,
c) a manipulator hand, and
d) a handling system for positioning said manipulator hand, said handling system being mounted on said carriage assembly, said handling system having at least six axes of movement for positioning said manipulator hand, one of said six axes of movement being a vertical axis of rotation with respect to said carriage assembly, wherein
said manipulator hand comprises:
a gripper having a gripped position for gripping a preselected cassette to allow said cassette to be transported between said cassette library and said cassette drive unit, and released position for releasing said cassette to allow said cassette to be inserted into said input slot of said cassette drive unit;
said gripper includes a housing, and a pair of separated finger members establishing a space therebetween and mounted to said housing, at least one of said finger members being movable relative to another of said finger members so as to effect said gripped and released postions; said gripper including an actuator connected operatively to said at least one finger member so as to pivotally move said at least one finger member between said gripped and released positions, and wherein said transport system further comprises;
e) a control system so as to achieve precise predetermined movements of said manipulator hand relative to said data storage cassette and relative to said cassette library and said drive unit thereby allowing said system to retrieve a preselected one of said data storage cassettes in said cassette library by gripping and removing said preselected data storage cassette from said cassette library, transporting said gripped preselected data storage cassette from said cassette library to said drive unit, orienting said gripped preselected cassette into alignment with said input slot of said drive unit, and inserting and releasing said preselected cassette within said slot of said at least one drive unit.

29. An automated archiving and retrieval system for computer data storage cassettes comprising:
a cassette library for archiving a number of data storage cassettes during periods of nonuse, said cassette library storing said computer data storage cassette in a vertically oriented position, said cassette library comprising a shelf extending in a longitudinal direction, said shelf comprising horizontal rows extending in said longitudinal direction for containing said data storage cassettes,
a plurality of cassette drive units each having an input slot sized to accept a data storage cassette therewithin, said data storage cassette being oriented in horizontal direction when inserted into said input slot said cassette drive unit being associated with a computer system, and
a transport system which includes:
a) a track system which defines a path between said cassette library and said drive units, said track system comprising at least two parallel track members which are arranged adjacent to both the cassette library and said drive unit, and support elements which are supportable by a subfloor spaced below a facility floor, said support elements supporting said at least two track members at said facility floor;
b) a carriage assembly supported by said at least two track members and capable of reciprocal rectilinear movements along said path between the cassette library and said drive units, said carriage assembly having a reversible electric motor for moving said carriage assembly along said path,
c) a manipulator hand, and
d) a handling system for positioning said manipulator hand, said handling system being mounted on said carriage assembly and having at least six computer controlled axes of movement for positioning said manipulator hand, at least four axes of said six axes of movement being rotary axes, and wherein one of said rotary axes is oriented vertical with respect to said carriage assembly, and another of said rotary axes connects said manipulator hand with said handling system, wherein
said manipulator hand comprises:
(i) a gripper having a gripped position for gripping a preselected cassette to allow said cassette to be transported between said cassette library and said cassette drive unit, and a released position for releasing said cassette to allow said cassette to be inserted into said input slot of said cassette drive unit;
said gripper includes a housing, and a pair of separated finger members establishing a space therebetween and mounted to said housing, at least one of said finger members being movable relative to another of said finger members so as to effect said gripped and released positions;
said gripper including actuator means connected operatively to said at least one finger member so as to pivotally move said at least one finger member between said gripped and released positions, and
(ii) a pusher for contacting and pushing said released cassette into a defined position within said cassette drive unit, and wherein said transport system further comprises:
a control system so as to achieve precise predetermined movements of said manipulator hand relative to said data storage cassette and relative to said cassette library and said drive unit thereby allowing said system to (1) retrieve said preselected one of said data storage cassettes in said cassette library, (2) grip and remove said preselected data storage cassette from said cassette library, (3) transport said gripped preselected data storage cassette from said cassette library to said drive unit, (4) orient said gripped preselected cassette into alignment with said input slot of said drive unit, and (5) insert and release said preselected cassette within said slot of said at least one drive unit.

30. An automated archiving and retrieval system for computer data storage cassettes comprising:

a cassette library for archiving a number of data storage cassettes during periods of nonuse, said cassette library storing said computer data storage cassettes in a vertically oriented position, said cassette library comprising horizontal rows for containing said data storage cassettes;

at least one cassette drive unit, said cassette drive unit being associated with a computer system, said cassette drive unit having an input slot sized to accept a data storage cassette therewithin, said data storage cassette being oriented in a horzontal direction when inserted into said input slot; and a transport system which includes:

a) a track system which defines a path between said cassette library and said drive units, said track system comprising two parallel track members which are arranged adjacent to both the cassette library and said drive unit, and support elements for supporting said track members, said support elements being supportable by a subfloor spaced below a ground surface;

b) a carriage assembly supported by said track members and capable of reciprocal rectilinear movements along said path between the cassette library and said drive units, said carriage assembly having a reversible electric motor for moving said carriage assembly along said path;

c) a manipulator hand; and d) a handling system for positioning said manipulator hand, said handling system being mounted on said carriage assembly and having at least six axes of movement for positioning said manipulator hand, one of said six axes of movement being a vertical axis of rotation with respect to said carriage assembly, wherein said manipulator hand comprises:

(i) a gripper having a gripped position for gripping a preselected cassette to allow said cassette to be transported between said cassette library and said cassette drive unit, and a released position for releasing said cassette to allow said cassette to be inserted into said input slot of said cassette drive unit, said gripper includes a housing, and a pair of separated finger members establishing a space therebetween and mounted to said housing, at least one of said finger members being movable relative to another of said finger members so as to effect said gripped and released positions, said gripper including an actuator connected operatively to said at least one finger member so as to pivotally move at least one finger member between said gripped and released positions; and (ii) an ejector movable between a retracted position and an extended position for ejecting said cassette into said input slot when said gripping finger members are in said released position, and wherein said transport system further comprises;

a control system so as to achieve precise predetermined movements of said manipulator hand relative to said data storage cassette and relative to said cassette library and said drive unit thereby allowing said system to (1) retrieve said preselected one of said data storage cassettes in said cassette library by gripping and removing said preselected data storage cassette from said cassette library, (2) transport said gripped preselected data storage cassette from said cassette library to said drive unit, (3) orient said gripped preselected cassette into alignment with said input slot of said drive unit, and (4) insert and release said preselected cassette within said slot of said at least one drive unit.

31. An automated archiving and retrieval system according to claim 30, wherein said gripper further comprises an ejector drive for moving said ejector from a retracted position into an extended position.

32. An automated archiving and retrieval system according to claim 31, wherein said ejector drive comprises a spring forcing said ejector from said retracted position and into said extended position.

33. An automated archiving and retrieval system for computer data storage cassettes comprising:

a cassette library for archiving a number of data storage cassettes during periods of nonuse, said cassette library storing said computer data storage cassette in a vertically oriented position, said cassette library comprising a shelf extending in a longitudinal direction, said shelf comprising horizontal rows extending in said longitudinal direction for containing said data storage cassettes, a plurality of cassette drive units each having an input slot sized to accept a data storage cassette therewithin, said data storage cassette being oriented in horizontal direction when inserted into said input slot, said cassette drive units being arranged in a row parallel to said longitudinal direction of said shelf, each cassette drive unit being associated with a computer system, and a transport system wherein said transport system includes:

a) a track system which includes a subfloor disposed below a ground surface, at least two parallel track members which are arranged adjacent the cassette library and said drive unit, a gear rack associated with said at least two parallel track members, and track support elements disposed on said subfloor so as to support said track above said subfloor at said ground surface, wherein said track members define a path between said cassette library and said drive units, b) a carriage assembly supported by said track members and capable of reciprocal rectilinear movements along said path between the cassette library and said drive units, said carriage assembly having a reversible electric motor which includes a pinion gear meshed with said gear rack associated with said track members, c) a manipulator hand, and d) a handling system for positioning a manipulator hand and being mounted on said carriage assembly, said handling system having at least six computer controlled axes of movement for positioning said manipulator hand, at least four axes of said six axes of movement being rotary axes, and one of said rotary axes being oriented vertical with respect to said carriage assembly and another of said rotary axes connecting said manipulator hand with said handling system, wherein said manipulator hand comprises:

a gripper having a gripped position for gripping a preselected cassette to allow said cassette to be transported between said cassette library and one of said cassette drive units, and a released position for releasing said cassette to allow said cassette to be inserted into said input slot of said one cassette drive unit;

said gripper including a housing, and a pair of separated finger members establishing a space therebetween and mounted to said housing, at least one of said finger members being movable relative to another of said finger members so as to effect said gripped and released positions;

said gripper further including an actuator connected operatively to said at least one finger member so as to pivotally move said at least one finger member between said gripped and released positions, and wherein said transport system further comprises;

a control system so as to achieve precise predetermined movements of said manipulator hand relative to said data storage cassette and relative to said cassette library and said drive units thereby allowing said system to retrieve said preselected one of said data storage cassettes in said cassette library by gripping and removing said preselected data storage cassette from said cassette library, transporting said gripped preselected data storage cassette from said cassette library to one of said drive units, orienting said gripped preselected cassette into alignment with said input slot of said drive unit and inserting and releasing said preselected cassette within said slot of said one drive unit.

34. An automated archiving and retrieval system according to claim 33, wherein said another of said finger members is rigidly fixed to said housing and wherein said one of said finger members is connected to said housing so as to be pivotally movable relative to said another finger member between said gripped and released positions.

35. An automated archiving and retrieval system according to claim 33 wherein said gripper further comprises an ejector movable between a retracted position and an extended poisition for ejecting said cassette into said input slot when said gripper is in said released position.

36. An automated archiving and retrieval system according to claim 35, wherein said ejector is operatively disposed in said space established between said pair of separated finger members for ejecting said cassette therefrom.

37. An automated archiving and retrieval system according to claim 36, wherein said ejector is in said retracted position when said cassette is gripped by means of said pair of finger members in said gripped position, and is moved into said extended position when said cassette is to be ejected from said space when said pair of finger members is in said released position.

38. An automated archiving and retrieval system according to claim 36, wherein said gripper further comprises an ejector drive for moving said ejector from said retracted position and into said extended position.

39. An automated archiving and retrieval system according to claim 38, wherein said ejector drive comprises a spring forcing said ejector from said retracted into said extended position.

40. An automated archiving and retrieval system according to claim 33, wherein said gripper further comprises means for contacting and pushing said released cassette into a defined position within said cassettte drive unit.

41. An automated archiving and retrieval system for computer data storage cassettes comprising:

a cassette library for archiving a number of data storage cassettes during periods of nonuse, said cassette library storing said computer data storage cassette, said cassette library comprising horizontal rows for containing said data storage cassettes, at least one cassette drive unit having an input slot sized to accept a data storage cassette therewithin, said data storage cassette being oriented in horizontal direction when inserted into said input slot, said cassette drive unit being associated with a computer system, and a transport system which includes:
   a) a track on a ground surface which defines a path between said cassette library and said drive units and which comprises two parallel track members which are arranged adjacent said cassette library and said drive unit,
   b) a carriage assembly supported on said track members and having an electric motor for driving said carriage assembly in reciprocal rectilinear movements along said path between the cassette library and said drive unit,
   c) a manipulator hand;
   d) a handling system for positioning said manipulator hand and being mounted on said carriage assembly, said handling system comprising
      a drive base carried by said carriage assembly,
      a proximal arm,
      a distal arm,
      a first axis of rotation between said proximal arm and said drive base,
      a second axis of rotation between said distal arm and said proximal arm and being oriented parallel to said first axis,
      a third axis of rotation between said distal arm and said manipulator hand,
      a fourth axis of rotation between said distal arm and said manipulator hand, said fourth axis being oriented transverse to said third axis, and
      at least two further axes of movement, all said axes of movement being computer controlled axes; and wherein said manipulator hand comprises:
   a gripper having a gripped position for gripping a preselected cassette to allow said cassette to be transported between said cassette library and said cassette drive unit, and a released position for releasing said cassette to allow said cassette to be inserted into said input slot of said cassette drive;
   said gripper including a housing, and a pair of separated finger members mounted to said housing and establishing a space therebetween, at least one of said finger members being movable relative to another of said finger members so as to effect said gripped and released positions;
   said gripper further including an actuator connected operatively to said at least one finger member so as to pivotally move said at least one finger member between said gripped and released positions, and wherein said transport system further includes:

e) a control system so as to achieve precise predetermined movements of said manipulator hand relative to said data storage cassette and relative to said cassette library and said drive unit thereby allowing said system to retrieve said preselected one of said data storage cassettes in said cassette library by gripping and removing said preselected data storage cassette from said cassette library, transporting said gripped preselected data storage cassette from said cassette library to said drive unit, orienting said gripped preselected cassette into alignment with said input slot of said drive unit and inserting and releasing said preselected cassette within said slot of said drive unit.

42. An automated archiving and retrieval system according to claim 41 wherein said gripper further comprises a pusher for contacting and pushing said released cassette into a defined position within said cassette drive unit.

43. An automated archiving and retrieval system according to claim 42, wherein said gripper further comprises an ejector movable between a retracted position and an extended position for ejecting said cassette into said input slot when said gripper is in said released position.

44. An automated archiving and retrieval system according to claim 43, wherein said gripper further comprises an ejector drive for moving said ejector relative to said space established between said pair of finger members to permit said ejector to be reciprocally movable between said retracted and extended positions.

45. An automated archiving and retrieval system according to claim 44, wherein said ejector is in said retracted position when said cassette is gripped by means of said pair of finger members in said gripped position, and is moved into said extended position when said cassette is to be ejected from said space when said pair of finger members is in said released position.

46. An automated archiving and retrieval system according to claim 44, wherein said ejector drive includes a spring for forcibly moving said ejector from said retracted position and into said extended position.

47. An automated archiving and retrieval system according to claim 43, wherein said said ejector is operatively disposed in said space for ejecting said cassette therefrom when said pair of finger members is in said released position.

48. An automated archiving and retrieval system according to claim 43, wherein said ejector extends beyond a terminal end of at least one of said finger members when said ejector is in said extended position.

49. An automated archiving and retrieval system according to claim 41, which further comprises a shock absorber to prevent structural crash between said manipulator hand and equipment with which it interacts.

50. An automated archiving and retrieval system according to claim 49, wherein said shock absorber comprises an elastic element for allowing said finger members to be rearwardly displaced in response to said pair of finger member experiencing a shock against a forward end thereof.

51. An automated archiving and retrieval system according to claim 49, wherein said shock absorber includes a guide rail for mounting said housing to permit reciprocal rectilinear displacements between forward and rearward positions, and an elastic member for exerting a bias force on said housing so that said housing is normally in said forward position, yet allowing said housing to be resiliently displaced rearwardly against the bias force thereof to thereby absorb shock.

52. An automated archiving and retrieval system according to claim 41, wherein said track includes a gear rack, and said electric motor includes a driven gear meshed with said gear rack of said track.

53. An automated archiving and retrieval system according to claim 52, wherein said gear rack is associated with one of said track members.

54. An automated archiving and retrieval system according to claim 41, further comprising a subfloor spaced below said ground surface, and support elements disposed on said subfloor and connected to said track members for supporting said track members above said subfloor at said ground surface.

55. An automated archiving and retrieval system according to claim 41, wherein said cassette library comprises a shelf extending in a longitudinal direction alongside said track and comprising horizontal rows extending in said longitudinal direction.

56. An automated archiving and retrieval system according to claim 55, wherein said cassettes are stored in said rows in a vertically oriented position.

* * * * *